(12) United States Patent
Fukuda et al.

(10) Patent No.: US 12,497,762 B2
(45) Date of Patent: Dec. 16, 2025

(54) WORKING VEHICLE AND ATTACHMENT USAGE SYSTEM

(71) Applicant: KUBOTA CORPORATION, Osaka (JP)

(72) Inventors: Yuji Fukuda, Sakai (JP); Tomoyuki Noguchi, Sakai (JP); Ryuki Matsumoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 86 days.

(21) Appl. No.: 18/434,915

(22) Filed: Feb. 7, 2024

(65) Prior Publication Data

US 2025/0250778 A1 Aug. 7, 2025

(51) Int. Cl.
*E02F 9/26* (2006.01)
*E02F 3/36* (2006.01)
*H04W 4/38* (2018.01)
*H04W 4/44* (2018.01)

(52) U.S. Cl.
CPC ............ *E02F 9/265* (2013.01); *E02F 3/3604* (2013.01); *H04W 4/38* (2018.02); *H04W 4/44* (2018.02)

(58) Field of Classification Search
CPC ...................................................... E02F 9/265
See application file for complete search history.

(56) References Cited

U.S. PATENT DOCUMENTS

| | | | |
|---|---|---|---|
| 11,524,537 B2* | 12/2022 | Ferrer | B62D 13/00 |
| 12,331,490 B2* | 6/2025 | Fukuda | G01S 1/0428 |
| 2022/0412040 A1* | 12/2022 | Zitterbart | E02F 3/431 |
| 2024/0337092 A1* | 10/2024 | Hamamoto | F15B 19/00 |

* cited by examiner

*Primary Examiner* — Michael A Berns
(74) *Attorney, Agent, or Firm* — Keating & Bennett, LLP

(57) ABSTRACT

A working vehicle includes a hitch, a receiver to receive wireless signal(s) from transmitter(s) in/on attachment(s) and including piece(s) of identification information of the attachment(s), and a controller configured or programmed to select identification information of the attached attachment based on the piece(s) of identification information included in the received signal(s) and received signal strength(s) of the signal(s); perform a process based on the selected information; cause a memory to store, for a period, the piece(s) of identification information included in the signal(s); calculate time(s) from when the signal(s) are received or time(s) from when the piece(s) of identification information are stored; calculate judgment value(s) based on the strength(s) at time point(s) at which the piece(s) of identification information are received and the calculated time(s); and select, based on the value(s), the identification information of the attached attachment from those stored in the memory.

24 Claims, 20 Drawing Sheets

Fig.3

| Attachment ID | Display data |
|---|---|
| ATT0001 | Name<br>Specifications<br>Icon etc. |
| ATT0002 | Name<br>Specifications<br>Icon etc. |
| ATT0003 | Name<br>Specifications<br>Icon etc. |
| ⋮ | ⋮ |

Fig.4

| Attachment ID | Control data<br>Amount of supply of hydraulic fluid |
|---|---|
| ATT0001 | None |
| ATT0002 | Small |
| ATT0003 | Large |
| ⋮ | ⋮ |

<Attachment information collecting process>

<Attachment information collecting process>

WORKING VEHICLE AND ATTACHMENT USAGE SYSTEM

BACKGROUND OF THE INVENTION

1. Field of the Invention

The present invention relates to techniques to use attachments on working vehicles.

2. Description of the Related Art

For example, the specification of U.S. Patent Application Publication No. 2022/412040 discloses a system to automatically determine the positions of attachments in the vicinity of a working vehicle. The system is such that a first communication unit (tool module) including a first acceleration sensor is provided on an attachment such as a bucket, a quick changer configured to quickly and simply attach and detach the attachment thereto and therefrom is provided at the distal end of the boom of the working vehicle (excavator), a second communication unit (receiving module) including a second acceleration sensor is provided at the quick changer, and the working vehicle is provided with an identification module and a controller.

The first communication unit transmits, to the second communication unit via a near field communication such as RFID or Bluetooth (registered trademark) Low Energy, a first acceleration signal relating to the instantaneous acceleration of the attachment detected by the first acceleration sensor and an identifying signal of the attachment. The second communication unit transmits, to the identification module, the first acceleration signal and the identifying signal received from the first communication unit and the second acceleration signal relating to the instantaneous acceleration of the quick changer detected by the second acceleration sensor. The identification module identifies the attachment attached to the quick changer based on the comparison (e.g., difference) between the first acceleration signal and the second acceleration signal received from the second communication unit and on the received signal strength of the first acceleration signal, and transmits the identification information of the attachment to the controller. The controller performs an appropriate operation (work operation) of the working vehicle based on the received identifying signal.

However, with the existing system as described above, although the distance between the quick changer and the attachment is determined based on the received signal strength of the first acceleration signal, the point in time at which the first acceleration signal was received is not considered.

SUMMARY OF THE INVENTION

Example embodiments of the present invention make it possible to accurately detect an attachment attached to a linkage.

A working vehicle according to an aspect of an example embodiment of the present invention includes a hitch to attach and detach an attachment thereto and therefrom, a receiver to receive one or more wireless signals which are transmitted periodically from one or more transmitters in or on one or more of the attachments, which include respective one or more pieces of identification information of the one or more attachments, and which are compliant with a near field communication standard, and a controller configured or programmed to select a piece of identification information of the attachment attached to the hitch based on the one or more pieces of identification information included in the one or more wireless signals received by the receiver and on one or more received signal strengths of the one or more wireless signals, and perform a predetermined process based on the selected piece of identification information, wherein the controller is configured or programmed to cause a memory to store, for a period of time, the one or more pieces of identification information included in the one or more wireless signals received by the receiver, calculate one or more elapsed times from when the one or more wireless signals including the one or more pieces of identification information are received or one or more elapsed times from when the one or more pieces of identification information are stored in the memory, calculate one or more judgment values based on the one or more received signal strengths of the one or more wireless signals at one or more points in time at which the one or more pieces of identification information are received and on the one or more elapsed times, and select, based on the one or more judgment values, the piece of identification information of the attachment attached to the hitch from the one or more pieces of identification information stored in the memory.

A working vehicle according to an aspect of an example embodiment of the present invention includes a hitch to attach and detach an attachment thereto and therefrom, a receiver to receive one or more wireless signals which are transmitted periodically from one or more transmitters in or on one or more of the attachments, which include respective one or more pieces of identification information of the one or more attachments, and which are compliant with a near field communication standard, and a controller configured or programmed to select a piece of identification information of the attachment attached to the hitch based on the one or more pieces of identification information included in the one or more wireless signals received by the receiver and on one or more received signal strengths of the one or more wireless signals, and perform a predetermined process based on the selected piece of identification information, wherein the controller is configured or programmed to cause a memory to store, for a period of time, the one or more pieces of identification information and the one or more received signal strengths of the one or more wireless signals at one or more points in time at which the one or more pieces of identification information are received such that the one or more pieces of identification information and the one or more received signal strengths are associated with each other, calculate one or more elapsed times from when the one or more wireless signals including the one or more pieces of identification information are received or one or more elapsed times from when the one or more pieces of identification information are stored in the memory, calculate one or more judgment values based on the one or more received signal strengths and the one or more elapsed times, and select, based on the one or more judgment values, the piece of identification information of the attachment attached to the hitch from the one or more pieces of identification information stored in the memory.

The controller may be configured or programmed to calculate the one or more judgment values such that the one or more judgment values concerning the one or more pieces of identification information calculated by the controller decrease as the one or more elapsed times increase.

The controller may be configured or programmed to calculate each of the one or more judgment values based on (i) a correction value obtained by multiplying a corresponding elapsed time by a coefficient, and (ii) a corresponding received signal strength of a corresponding wireless signal when a corresponding piece of identification information is received.

The controller may be configured or programmed to calculate each of the one or more judgment values by subtracting the correction value from the corresponding received signal strength of the corresponding wireless signal when the corresponding piece of identification information is received or by dividing, by the correction value, the corresponding received signal strength of the corresponding wireless signal when the corresponding piece of identification information is received.

The controller may be configured or programmed to perform the predetermined process based on one of the one or more pieces of identification information stored in the memory that is highest in terms of a judgment value when the attachment is attached to the hitch.

The controller may be configured or programmed to, if two or more pieces of identification information of the one or more pieces of identification information stored in the memory are the highest in terms of the judgment value when the attachment is attached to the hitch, perform the predetermined process based on one of the two or more pieces of identification information that is longest in terms of an elapsed time.

The controller may be configured or programmed to, if two or more pieces of identification information of the one or more pieces of identification information stored in the memory are the highest in terms of the judgment value when the attachment is attached to the hitch, perform the predetermined process based on one of the two or more pieces of identification information that is shortest in terms of an elapsed time.

The working vehicle may further include an operation switch to be operated to attach the attachment to the hitch. The controller may be configured or programmed to determine whether or not the attachment is attached to the hitch based on an operation state of the operation switch.

The controller may be configured or programmed to determine that the attachment is attached to the hitch if the operation switch is operated for a predetermined period of time or more.

The controller may be configured or programmed to select the piece of identification information of the attachment attached to the hitch from one or more of the one or more pieces of identification information included in one or more of the one or more wireless signals received by the receiver that are higher in terms of a received signal strength or a judgment value than a predetermined value.

The controller may be configured or programmed to cause the memory to store one or more of the one or more pieces of identification information included in one or more of the one or more wireless signals received by the receiver that are higher in terms of a received signal strength or a judgment value than a predetermined value, and cause the memory to not store any of the one or more pieces of identification information included in one or more of the one or more wireless signals received by the receiver that are equal to or lower than the predetermined value in terms of the received signal strength or the judgment value.

An attachment usage system according to an aspect of an example embodiment of the present invention includes a hitch on a working vehicle to attach and detach an attachment thereto and therefrom, one or more transmitters in or on one or more of the attachments to periodically transmit one or more wireless signals which include one or more pieces of identification information of the one or more attachments and which are compliant with a near field communication standard, a receiver in or on the working vehicle to receive the one or more wireless signals transmitted from the one or more transmitters, and a controller configured or programmed to select a piece of identification information of the attachment attached to the hitch based on the one or more pieces of identification information included in the one or more wireless signals received by the receiver and on one or more received signal strengths of the one or more wireless signals, and perform a predetermined process based on the selected piece of identification information, wherein the controller is configured or programmed to cause a memory to store, for a period of time, the one or more pieces of identification information included in the one or more wireless signals received by the receiver, calculate one or more elapsed times from when the one or more wireless signals including the one or more pieces of identification information are received or one or more elapsed times from when the one or more pieces of identification information are stored in the memory, calculate one or more judgment values based on the one or more received signal strengths of the one or more wireless signals at one or more points in time at which the one or more pieces of identification information are received and on the one or more elapsed times, and select, based on the one or more judgment values, the piece of identification information of the attachment attached to the hitch from the one or more pieces of identification information stored in the memory.

An attachment usage system according to an aspect of an example embodiment of the present invention includes a hitch on a working vehicle to attach and detach an attachment thereto and therefrom, one or more transmitters in or on one or more of the attachments to periodically transmit one or more wireless signals which include one or more pieces of identification information of the one or more attachments and which are compliant with a near field communication standard, a receiver in or on the working vehicle to receive the one or more wireless signals transmitted from the one or more transmitters, and a controller configured or programmed to select a piece of identification information of the attachment attached to the hitch based on the one or more pieces of identification information included in the one or more wireless signals received by the receiver and on one or more received signal strengths of the one or more wireless signals, and perform a predetermined process based on the selected piece of identification information, wherein the controller is configured or programmed to cause a memory to store, for a period of time, the one or more pieces of identification information and the one or more received signal strengths of the one or more wireless signals at one or more points in time at which the one or more pieces of identification information are received such that the one or more pieces of identification information and the one or more received signal strengths are associated with each other, calculate one or more elapsed times from when the one or more wireless signals including the one or more pieces of identification information are received or one or more elapsed times from when the one or more pieces of identification information are stored in the memory, calculate one or more judgment values based on the one or more received signal strengths and the one or more elapsed times, and select, based on the one or more judgment values, the piece of identification information of the attachment attached to the hitch from the one or more pieces of identification information stored in the memory.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 3 is a diagram showing an example of the relationship between attachment IDs and their corresponding pieces of display data.

FIG. 4 is a diagram showing an example of the relationship between attachment IDs and their corresponding pieces of control data.

DETAILED DESCRIPTION OF THE EXAMPLE EMBODIMENTS

Figure 1:
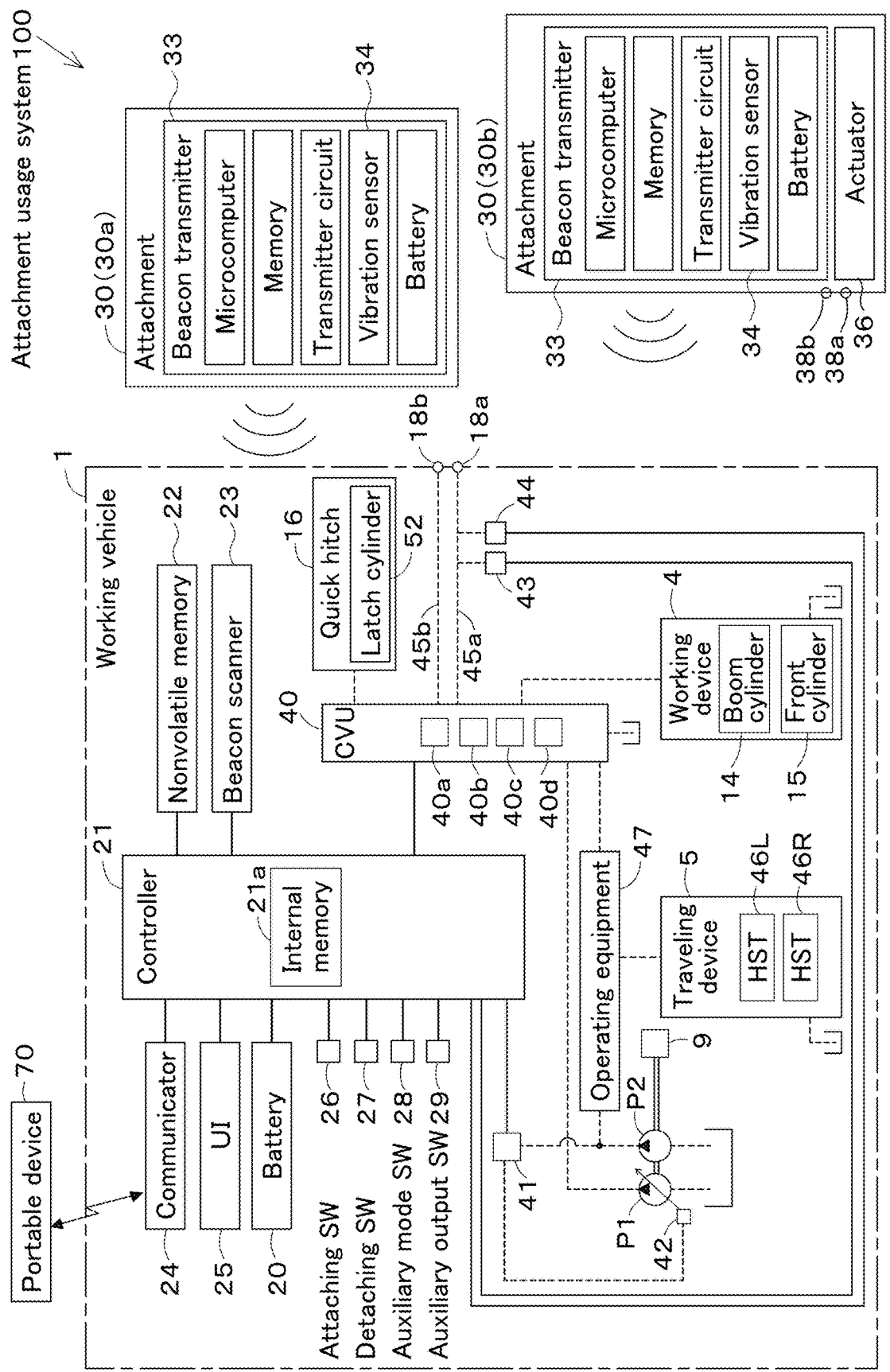
FIG. 1 is a block diagram of an attachment usage system and a working vehicle.

The example embodiments will now be described with reference to the accompanying drawings, wherein like reference numerals designate corresponding or identical elements throughout the various drawings. The drawings are to be viewed in an orientation in which the reference numerals are viewed correctly.

The following description discusses example embodiments of the present invention with reference to the drawings as needed.

Figure 17:
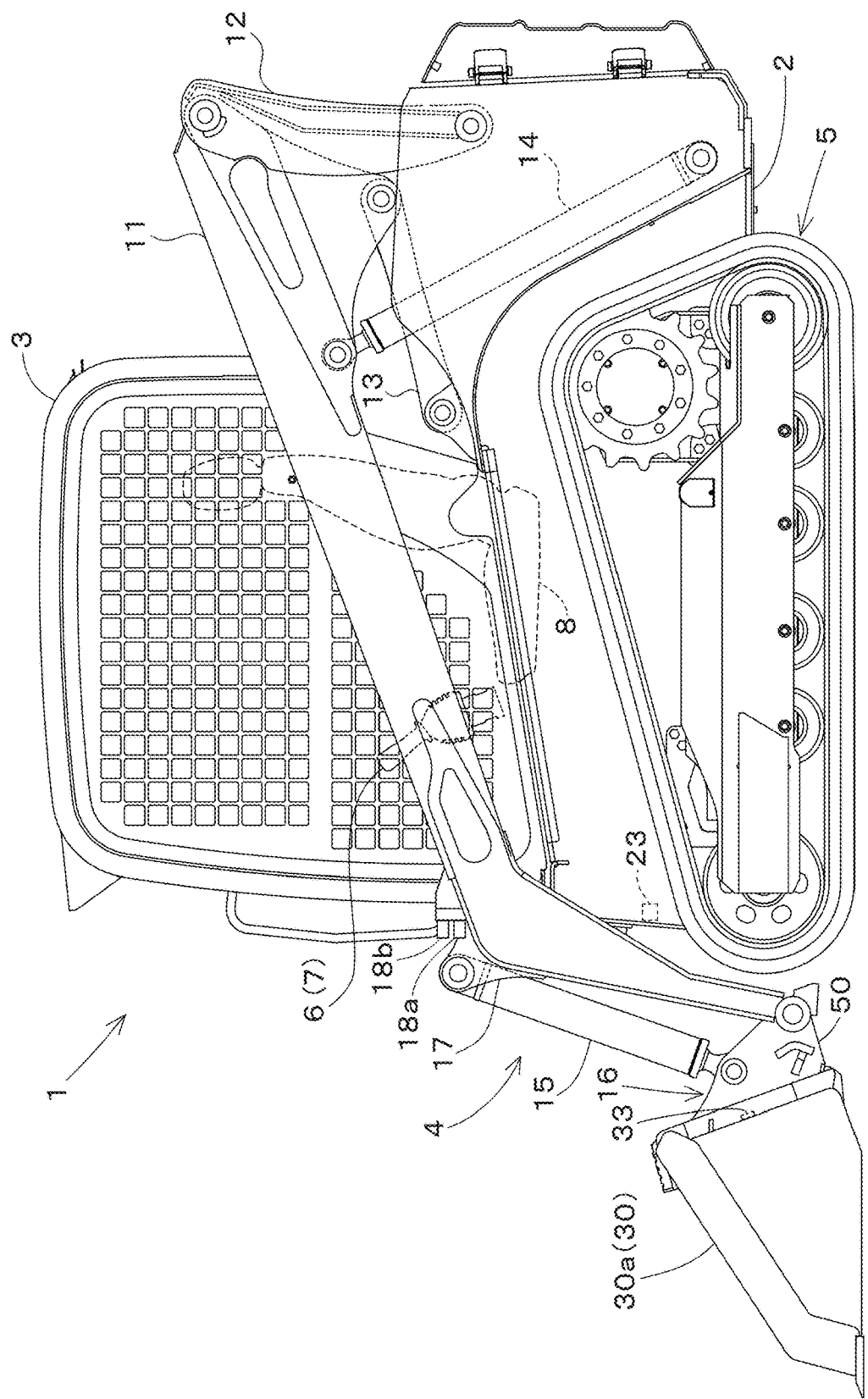
FIG. 17 is a side view of a working vehicle.

FIG. 17 is a side view of a working vehicle 1 according to the present example embodiment. In the present example embodiment, a compact track loader is discussed as an example of the working vehicle 1. Note, however, that the working vehicle according to an example embodiment of the present invention is not limited to a compact track loader, and may be, for example, some other construction machine or agricultural machine such as a skid-steer loader, a backhoe, or a tractor.

The working vehicle 1 includes a machine body 2, a cabin 3, a working device 4, and traveling device(s) 5. The cabin 3 is provided on the machine body 2. The cabin 3 includes an operator's seat 8, operation members (manual operators) to be operated by an operator seated on the operator's seat 8, and/or the like. The operation members include a travel operation member 6 to operate the traveling devices 5 and a work operation member 7 to operate the working device 4.

The traveling devices 5 are provided on the left and right sides of the machine body 2 and support the machine body 2 such that the machine body 2 is allowed to travel. The traveling devices 5 are crawler traveling devices. The operator operates the travel operation member 6 to cause both the left and right traveling devices 5 to rotate in a forward direction, both the left and right traveling devices 5 to rotate in a reverse direction, only one of the left and right traveling devices 5 to rotate in the forward direction, or one of the left and right traveling devices 5 to rotate in the forward direction and the other to rotate in the reverse direction to cause the machine body 2 (working vehicle 1) to travel forward, rearward, or turn left or right.

The working device 4 is attached to the machine body 2. The working device 4 includes an attachment 30, boom(s) 11, lift link(s) 12, control link(s) 13, boom cylinder(s) 14, front cylinder(s) 15, and a hitch (quick hitch) 16.

The attachment 30 is, for example, a working implement such as a bucket 30a, which is attachable to and detachable from the quick hitch 16. Examples of attachments 30 other than the bucket 30a include earth augers, angle brooms, crushers, grapples, cold planers, sweepers, skid cutters, skid graders, stump grinders, snow blowers, snow pushers, spreaders, dozer blades, trenchers, breakers, pallet forks, hopper brooms, mowers, rippers, loader booms, and rotary tillers.

The booms 11, the lift links 12, the control links 13, the boom cylinders 14, and the front cylinders 15 are provided at the left and right of the cabin 3. The left and right booms 11 are connected to each other by a connector 17 at an intermediate portion of their front portion. The left boom 11 has, at the front portion thereof, a hydraulic fluid outlet port (power output port) 18a and a hydraulic fluid inlet port 18b.

The lift links 12 and the control links 13 support proximal portions (rear portions) of the booms 11 via shafts such that the booms 11 are swingable up and down. The boom cylinders 14 each have one end thereof pivotally connected to a corresponding one of the booms 11 via a shaft and the other end thereof pivotally connected to a lower rear portion of the machine body 2 via a shaft. Upon operation of the work operation member 7 along a first direction by the operator of the working vehicle 1, the boom cylinders 14 extend or retract and the booms 11 ascend or descend (swing upward or downward).

The following details the quick hitch 16. The quick hitch 16 is provided at distal ends of the booms 11. The operator of the working vehicle 1 can easily change attachments 30 using the quick hitch 16. The quick hitch 16 is therefore also called "quick changer". In the example shown in FIG. 17, the bucket 30a which is an example of the attachment 30 is attached to a front portion of the quick hitch 16.

The quick hitch 16 has, connected to a rear portion thereof, the distal ends of the booms 11 and ends of the front cylinders 15 via respective shafts such that the booms 11 and the front cylinders 15 are pivotable. The opposite ends of the front cylinders 15 are pivotally connected to the connector 17 via shafts. Upon operation of the work operation member 7 along a second direction by the operator, the front cylinders 15 extend or retract and the quick hitch 16 swings upward or rearward. With this, the bucket 30a attached to the quick hitch 16, swinging upward or downward, performs shoveling or dumping.

Figure 18:
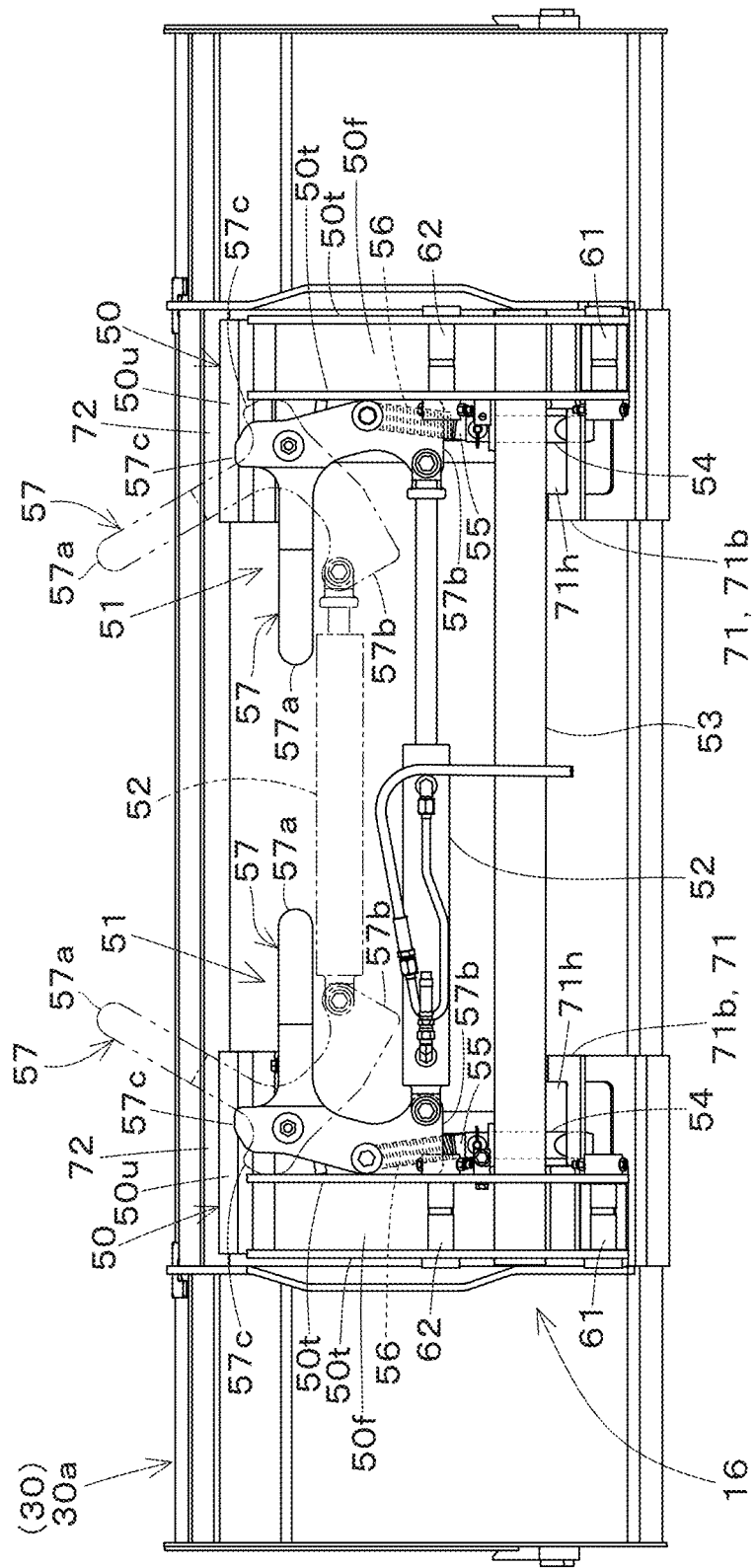
FIG. 18 is an elevational view of a quick hitch.
Figure 19A:
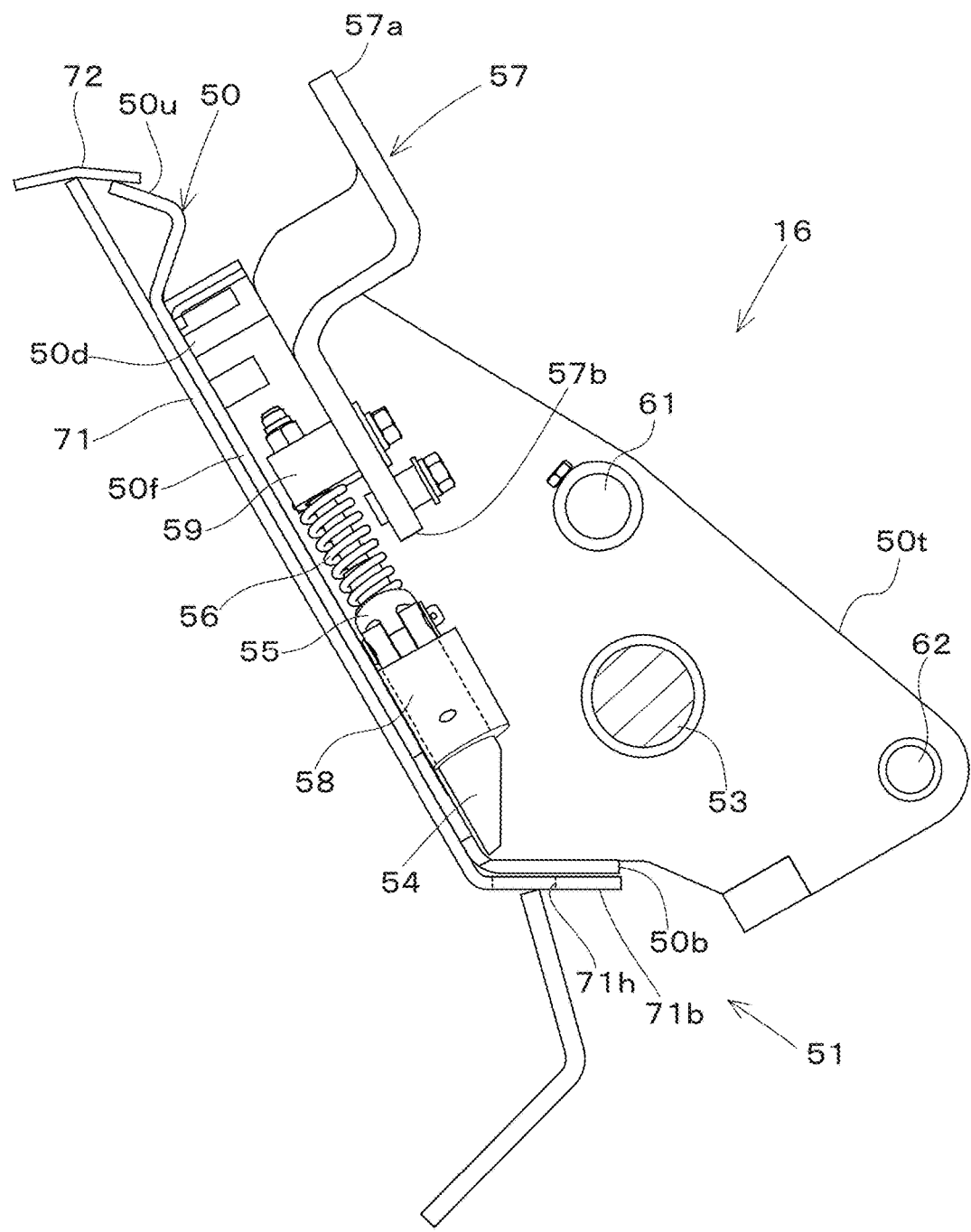
FIG. 19A is a side view of an attachment unlatched by a quick hitch.
Figure 19B:
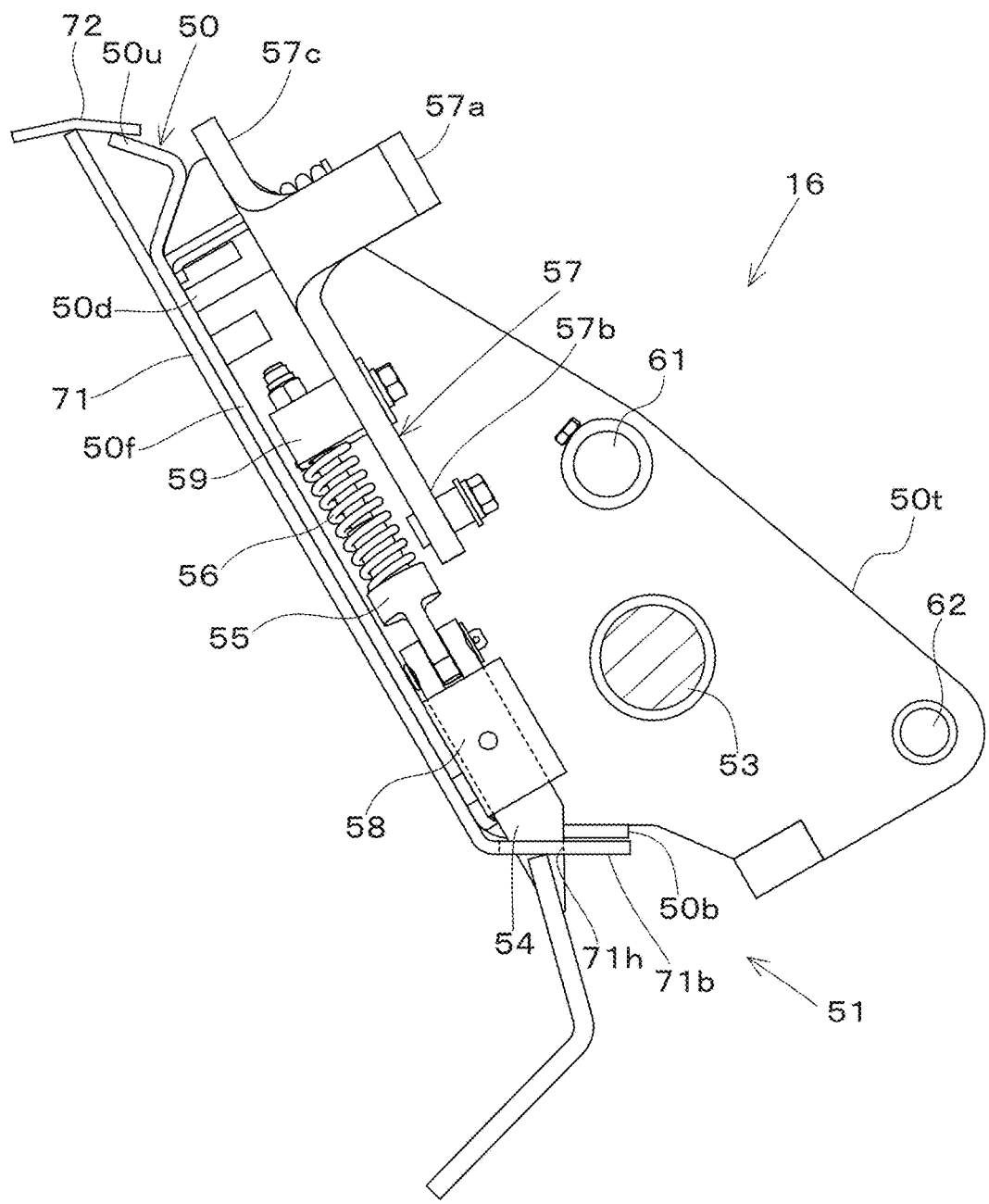
FIG. 19B is a side view of an attachment latched by a quick hitch.

FIG. 18 is an elevational view of the quick hitch 16. Specifically, FIG. 18 illustrates the quick hitch 16 in FIG. 17 as viewed from the machine body 2 of the working vehicle 1. FIG. 19A is a side view illustrating the quick hitch 16 in an unlatching state. FIG. 19B is a side view illustrating the quick hitch 16 in a latching state.

The quick hitch 16 includes a pair of left and right brackets 50, a pair of left and right latching mechanisms 51, a latch cylinder 52, and the like. The brackets 50 hold the attachment 30. The latching mechanisms 51 are selectively operable in a latching state in which the attachment 30 is secured to the brackets 50 (quick hitch 16) or an unlatching state in which the attachment 30 is allowed to be detached from the brackets 50. The latch cylinder 52 is a latch actuator to place the latching mechanisms 51 selectively in the latching state or the unlatching state.

As illustrated in FIG. 19A, each of the brackets 50 includes a front plate 50f and a pair of connector plates 50t projecting rearward from the front plate 50f. The connector plates 50t have, pivotally connected thereto, the distal ends of the left and right booms 11 (FIG. 17) via shafts 61, and have, pivotally connected thereto, ends of the left and right front cylinders 15 (FIG. 17) via shafts 62. The connector plates 50t are connected to a beam 53, so that the pair of brackets 50 are combined.

The front plate 50f of each of the brackets 50 includes an upper portion 50u bent in the form of the letter V as illustrated in FIG. 19A. The front plate 50f includes a lower portion 50b bent such that the lower portion 50b projects diagonally rearward. A top plate 72 bent downward is provided above a base plate 71 of the attachment 30. The base plate 71 includes a lower portion 71b bent such that the lower portion 71b projects diagonally rearward. The lower portion 71b of the base plate 71 has a through-hole 71h.

The upper portions 50u of the front plates 50f of the brackets 50 are inserted into the gap between the base plate 71 and the top plate 72 of the attachment 30 and engage with the back surface of the top plate 72, the front surfaces of the front plates 50f engage with the base plate 71, and the lower portions 50b of the front plates 50f engage with the lower portion 71b of the base plate 71. With this, the attachment 30 is held by the brackets 50.

The latching mechanisms 51 are located inward of the connector plates 50t of the brackets 50 in FIG. 18. Each of the latching mechanisms 51 includes, as illustrated in FIG. 19A, a latch pin 54, a link 55, a coil spring 56, a latch lever 57, and the like. The latch pin 54 is held by a housing 58 fixed to a corresponding bracket 50 such that the latch pin 54 is movable up and down. The latch pin 54 includes a lower portion projecting downward from the housing 58, and the lower portion has an inclined surface sloping diagonally forward and downward. The latch pin 54 includes an upper portion rotatably connected to a lower end portion of the link 55 via pin(s). The link 55 is inserted in the coil spring 56.

The link 55 includes an upper end portion projecting from the coil spring 56, and the upper end portion is held by a holder 59.

Each latch lever 57 is substantially in the form of the letter L as illustrated in FIG. 18. The latch lever 57 includes a bent intermediate portion which is rotatably connected to a mount 50d on a corresponding bracket 50 via pin(s) as illustrated in FIG. 19A. The latch lever 57 includes a first projecting portion 57a which projects inward from corresponding connector plates 50t as illustrated in FIG. 18. The latch lever 57 includes a second projecting portion 57b projecting downward. The second projecting portion 57b has, connected to a back surface of a central portion thereof, the holder 59 via pin(s) as illustrated in FIG. 19A. The latch lever 57 includes a third projecting portion 57c which projects upward as illustrated in FIG. 18.

The latch cylinder 52 is a hydraulic cylinder which is positioned laterally and located above the beam 53. The latch cylinder 52 has a first end (distal end of the rod) pivotally connected to the distal end portion of the second projecting portion 57b of one of the latch levers 57 (right latch lever 57 in FIG. 18) via pin(s). The latch cylinder 52 has a second end (bottom of the cylinder case) pivotally connected to the distal end portion of the second projecting portion 57b of the other of the latch levers 57 (the left latch lever 57 in FIG. 18) via pin(s).

The retraction of the latch cylinder 52, as indicated by dot-dot-dash lines in FIG. 18, causes the second projecting portions 57b of the left and right latch levers 57 to approach each other, causing the latch levers 57 to pivot upward. Then, as illustrated in FIG. 19A, the links 55 and the latch pins 54 move upward and the latch pins 54 detach from the through-holes 71h in the base plate 71 of the attachment 30.

With this, the latching mechanisms 51 are placed in their unlatching state (also referred to as "unlock state") in which the latching mechanisms 51 do not hold the attachment 30, allowing the attachment 30 to be detached from the quick hitch 16. The third projecting portions 57c of the latch levers 57 contact corresponding connector plates 50t of the brackets 50, so that the degree of retraction of the latch cylinder 52, the angle of upward rotation of the latch levers 57, and the degree of upward movement of the latch pins 54 are restricted.

Upon the extension of the latch cylinder 52 as indicated by solid lines in FIG. 18 from the state as illustrated in FIG. 19A, the second projecting portions 57b of the left and right latch levers 57 are pushed to cause the latch levers 57 to pivot downward. Upon such pivoting, the holders 59 cause the links 55 and the latch pins 54 to move downward and compress the coil springs 56. Then, as illustrated in FIG. 19B, the latch pins 54 are inserted in the through-holes 71h in the base plate 71 of the attachment 30, so that the inclined surfaces of the latch pins 54 contact the side walls of the through-holes 71h.

With this, the latching mechanisms 51 are placed in their latching state (also referred to as "lock state") in which the latching mechanisms 51 hold the attachment 30, and the attachment 30 is attached to the quick hitch 16. The second projecting portions 57b of the latch levers 57 contact corresponding connector plates 50t of the brackets 50, so that the degree of extension of the latch cylinder 52, the angle of downward rotation of the latch levers 57, and the degree of downward movement of the latch pins 54 are restricted. It is noted here that the spring back force of the coil springs 56 holds the latch levers 57 in position. Since the first projecting portions 57a of the latch levers 57 are positioned horizontally, the operator seated on the operator's seat 8 of the working vehicle 1 confirms that the attachment 30 is attached to the quick hitch 16 (working vehicle 1) by looking at the horizontally positioned first projecting portions 57a.

Starting from the state as illustrated in FIG. 17 in which the bucket 30a is attached to the quick hitch 16, the bucket 30a is detached and another attachment 30 is attached to the quick hitch 16. This makes it possible to perform work other than excavation (or some other excavation work) using the other attachment 30.

FIG. 1 is a block diagram of an attachment usage system 100 and the working vehicle 1 according to the present example embodiment. The attachment usage system 100 includes the working vehicle(s) 1 and attachment(s) 30. The example in FIG. 1 includes one working vehicle 1 and two attachments 30, but the number of working vehicles 1 and the number of attachments 30 included in the attachment usage system 100 may be selected appropriately.

The working vehicle 1 includes a controller 21, one or more storing units (memory (memories) and/or storage(s)) 22, a receiver 23, a communicator 24, a user interface (indicated as "UI" in FIG. 1) 25, a battery 20, switches (each indicated as "SW" in FIGS. 1) 26 to 29, and/or the like.

The controller 21 may include a processing circuit including one or more processors. The controller 21 is a controller for the working vehicle 1 and is configured or programmed to perform various controls relating to the working vehicle 1. The controller 21 is communicably connected to devices in or on the working vehicle 1 via an in-vehicle network such as CAN, ISOBUS, LIN, and/or FlexRay.

The controller 21 includes one or more memories, analog circuit(s), digital circuit(s), and/or the like. The one or more memories store (record) software program(s) to be executed by one or more processors and/or various data. Specifically, a memory 21a (internal memory) of the one or more memories of the controller 21 is a volatile memory or a nonvolatile memory. The controller 21 may, for example, use a predetermined storage area of the memory 21a, which is a volatile memory as a buffer for temporary storage of information and data.

The controller 21 has the storing unit(s) 22 (nonvolatile memory) communicably connected thereto. The storing unit 22 is provided externally to the controller 21. The memory 21a and the storing unit 22 store software program(s) and control data for the controller 21 to control operation of the elements. The storing unit 22 stores pieces of control data corresponding to various attachments 30.

The controller 21 can include one or more processors to read software program(s) and control data from the storing unit 22 and perform various processes based on the software program(s) and the control data. For example, the storing unit 22 stores a clock program to measure time, and the controller 21 reads the clock program from the storing unit 22 to determine time (Common Era (CE) year, date, time). Note that the controller 21 may include one or more processors to perform various processes based on predetermined logic circuit(s).

Examples of the processors include central processing unit (CPU), graphics processing unit (GPU), digital signal processor (DSP), field programmable gate array (FPGA), and application specific integrated circuit (ASIC).

Note that the controller 21 may include two or more physically separated processors cooperating to perform various processes, and the structure thereof is not limited to those described above. In such a case, the two or more processors are provided in or on the working vehicle 1 and one or more computers physically separated from the working vehicle 1, and are communicably connected to each other via a network such as an in-vehicle network, LAN, WAN, or the Internet.

The software program(s) may be stored in recording medium (media) (nonvolatile memory (memories) such as HDD, SSD, CD-ROM, and/or DVD-ROM) communicably connected to the controller 21 and/or external server device(s) connected to the controller 21 via a network, and may be installed from the medium, the server device, and/or the like into the memory.

The receiver 23 is a device to receive wireless signals compliant with a near field communication standard. Specifically, the receiver 23 is a beacon scanner to receive wireless signals (beacon signals) compliant with Bluetooth (registered trademark) Low Energy which is a near field communication standard. The beacon scanner 23 measures the received signal strength indicator (RSSI, received signal strength) of the received wireless signals. Note that RSSI may be hereinafter simply referred to as received signal strength. The receiver 23 is provided in or on the machine body 2.

The communicator 24 communicates with a portable device 70 via the Internet or wireless LAN. The portable device 70 is a smartphone, a tablet computer, and/or the like. The user interface 25 includes, for example, a touchscreen (touch panel) and/or the like. For another example, the user interface 25 may include an input and an output provided independently of each other.

The battery 20 supplies electricity to electric equipment in and/or on the working vehicle 1. The attaching switch 26, the detaching switch 27, the auxiliary mode switch 28, and the auxiliary output switch 29 are respective operation switches to be operated by the operator of the working vehicle 1. The attaching switch 26 and the detaching switch 27 are momentary operation switches. The user interface 25 and the switches 26 to 29 are provided operably in the vicinity of the operator's seat 8 in the cabin 3.

The attaching switch (first operation switch, operation switch) 26 is operated to attach the attachment 30 to the quick hitch 16. The detaching switch (second operation switch) 27 is operated to allow the attachment 30 to be detached from the quick hitch 16. The auxiliary mode switch 28 is operated to start an auxiliary mode in which predetermined attachment(s) 30 are usable. The auxiliary output switch (third operation switch) 29 is operated to supply (transmit) hydraulic fluid as power to the hydraulic fluid outlet port 18a.

The working vehicle 1 includes, as hydraulic-related features, a main pump P1, a pilot pump P2, a control valve unit (indicated as "CVU" in FIG. 1) 40, a proportional valve 41, a regulator 42, sensors 43 and 44, hydraulic actuators 14, 15, 46L, 46R, and 52, fluid passage(s), a tank, and/or the like. The main pump P1 and the pilot pump P2 are driven by power from a prime mover 9 to deliver hydraulic fluid sucked from the tank to fluid passage(s). The prime mover 9 includes, for example, an engine. For another example, the prime mover 9 may include an electric motor.

The main pump P1 is a variable displacement hydraulic pump. The regulator 42 changes the angle of the swash plate of the main pump P1. The controller 21 controls the opening of the proportional valve 41 to apply pilot pressure, which is the hydraulic pressure of hydraulic fluid delivered by the pilot pump P2, to the regulator 42. The controller 21 then actuates the regulator 42 to change the angle of the swash plate of the main pump P1 to change the amount of hydraulic fluid delivered by the main pump P1. Operating equipment 47 includes the travel operation member 6 and work operation member 7, operating valves corresponding to the travel operation member 6 and the work operation member 7, switching valve(s), and the like.

The control valve unit 40 allows hydraulic fluid supplied from the main pump P1 through fluid passage(s) to flow to the boom cylinders 14 and the front cylinders 15 of the working device 4, the latch cylinder 52 of the quick hitch 16, and the hydraulic fluid outlet port 18a. The control valve unit 40 also allows hydraulic fluid that flows from the boom cylinders 14, the front cylinders 15, the latch cylinder 52, and the hydraulic fluid inlet port 18b (return fluid) to be discharged. The control valve unit 40 controls the direction and amount of supply of hydraulic fluid to the boom cylinders 14, the front cylinders 15, and the latch cylinder 52. The control valve unit 40 also controls the amount of supply of hydraulic fluid to the hydraulic fluid outlet port 18a.

Specifically, the control valve unit 40 includes control valves 40a, 40b, 40c, and 40d corresponding to the boom cylinders 14, the front cylinders 15, the latch cylinder 52, and the ports 18a and 18b. Each of the control valves 40a, 40b, 40c, and 40d is switchable between a neutral position, a first position, and a second position. At least the control valves 40c and 40d of the control valves 40a, 40b, 40c, and 40d are electrically actuated. The control valves 40a, 40b, 40c, and 40d are normally held in the neutral position by the elastic force of a spring.

The operating valve(s) of the operating equipment 47 and/or the like that correspond to the work operation member 7 are actuated according to the manner in which the work operation member 7 is operated, thus allowing the pilot pressure of pilot fluid from the pilot pump P2 to act on pressure receiver(s) of the control valve(s) 40a and/or 40b. For example, the work operation member 7 may be supported on operating valve(s) of the operating equipment 47 and the operating valve(s) may be physically actuated by operation of the work operation member 7. Additionally or alternatively, a detection sensor to detect the amount (degree) and direction of operation of the work operation member 7 may be provided and the controller 21 may electrically actuate the operating valve(s) based on the detection result from the detection sensor. With this, the control valve(s) 40a and/or 40b is/are switched from the neutral position to the first position or the second position, so that hydraulic fluid from the main pump P1 is supplied through the control valve(s) 40a and/or 40b to the boom cylinders 14 and/or the front cylinders 15 to cause the boom cylinders 14 and/or the front cylinders 15 to extend or retract. It follows that the booms 11 and/or the attachment 30 such as the bucket 30a attached to the quick hitch 16 swing.

While the attaching switch 26 is being operated, the controller 21 places the control valve 40c in the first position to allow hydraulic fluid from the main pump P1 to be supplied to the latch cylinder 52 in the first direction to cause the latch cylinder 52 to extend. Accordingly, the operation of the attaching switch 26 that lasts for a first predetermined period of time T1 or more while the latching mechanisms 51 are in the unlatching state causes the latch cylinder 52 to extend to the predetermined degree or more, bringing the latching mechanisms 51 into the latching state. Even if the attaching switch 26 is operated, provided that the operation only lasts for a period less than the first predetermined period of time T1, the latch cylinder 52 does not extend to the predetermined degree or more and therefore the latching mechanisms 51 are not brought into the latching state.

Therefore, the latching mechanisms 51 are moved back by the spring back force of the coil springs 56 to the original unlatching state.

On the contrary, while the detaching switch 27 is being operated, the controller 21 places the control valve 40c in the second position to allow hydraulic fluid from the main pump P1 to be supplied to the latch cylinder 52 in a second direction opposite to the first direction to cause the latch cylinder 52 to retract. Accordingly, the operation of the detaching switch 27 that lasts for a second predetermined period of time T2 or more while the latching mechanisms 51 are in the latching state causes the latch cylinder 52 to retract to a predetermined degree or more, bringing the latching mechanisms 51 into the unlatching state. Even if the detaching switch 27 is operated, provided that the operation only lasts for a period less than the second predetermined period of time T2, the latch cylinder 52 does not retract to the predetermined degree or more and therefore the latching mechanisms 51 are not brought into the unlatching state. Therefore, the latching mechanisms 51 are moved back by the spring back force of the coil springs 56 to the original latching state.

The first predetermined period of time T1 and the second predetermined period of time T2 are each, for example, about 2 to 3 seconds. The first predetermined period of time T1 and the second predetermined period of time T2 may be the same period or different periods. The specific values of the first predetermined period of time T1 and the second predetermined period of time T2 are examples, and not limited to the values above. The same applies to a third predetermined period of time T3 and a period of time T4 (described later).

When the auxiliary mode switch 28 is operated and the auxiliary mode is selected, a specific attachment 30 is attached to the quick hitch 16. The hydraulic fluid outlet port 18a and a hydraulic fluid inlet port 38b of the specific attachment 30b are connected together by a hose, and the hydraulic fluid inlet port 18b and a hydraulic fluid outlet port 38a of the specific attachment 30b are connected together by a hose.

Upon operation of the auxiliary output switch 29 under such circumstances, the controller 21 switches the control valve 40d from the neutral position to the first position or the second position. With this, hydraulic fluid from the main pump P1 is supplied (transmitted) through a fluid passage 45a to the hydraulic fluid outlet port 18a, and hydraulic fluid flowing into a fluid passage 45b from the hydraulic fluid inlet port 18b is drained through the control valve unit 40.

With this, hydraulic fluid discharged through the hydraulic fluid outlet port 18a is introduced into the specific attachment 30b through the hydraulic fluid inlet port 38b via a hose or the like. Furthermore, hydraulic fluid (return fluid) discharged through the hydraulic fluid outlet port 38a of the specific attachment 30b is introduced through the hydraulic fluid inlet port 18b via a hose or the like and is drained from the control valve unit 40. Since hydraulic fluid is introduced and discharged to and from the specific attachment 30b as such, hydraulic actuators 36 such as a hydraulic motor and/or hydraulic cylinder(s) of the attachment 30b are actuated, making it possible to perform work using the attachment 30b.

When allowing hydraulic fluid to be introduced and discharged to and from the specific attachment 30b, the controller 21 changes the opening of the control valve 40d depending on what specific attachment 30b is attached to the quick hitch 16, to adjust the flow rate or hydraulic pressure of hydraulic fluid supplied to the hydraulic fluid outlet port 18a. For example, the controller 21 may cause the flow rate sensor 43 to detect the flow rate of hydraulic fluid flowing through the fluid passage 45a and control the opening of the control valve 40d. Additionally or alternatively, the controller 21 may cause the pressure sensor 44 to detect the hydraulic pressure of hydraulic fluid flowing through the fluid passage 45a and control the opening of the control valve 40d.

The pair of left and right traveling devices 5 include a pair of left and right hydro-static transmissions (HSTs) 46L and 46R corresponding to the pair of left and right traveling devices 5. Each of the HSTs 46L and 46R includes hydraulic pump(s) and a travel motor (hydraulic motor).

The operating valve(s) of the operating equipment 47 and/or the like that correspond to the travel operation member 6 are actuated according to the manner in which the travel operation member 6 is operated, so that a pilot pressure of pilot fluid from the pilot pump P2 acts on pressure receiver(s) of the swash plate(s) of the hydraulic pump(s) of the HST(s) 46L and/or 46R, thus changing the angle of inclination of the swash plate(s). For example, the travel operation member 6 may be supported on operating valve(s) of the operating equipment 47 and the operating valve(s) may be physically actuated by operation of the travel operation member 6. Additionally or alternatively, a detection sensor to detect the amount (degree) and direction of operation of the travel operation member 6 may be provided and the controller 21 may electrically actuate the operating valve(s) based on the detection result from the detection sensor. This controls the supply, the stopping of supply, and the direction of supply of hydraulic fluid from the hydraulic pump(s) of the HSTs 46L and/or 46R to the travel motor(s), the travel motor(s) rotate(s) in the forward direction, rotate in the reverse direction, or stop, the left and/or right traveling device(s) 5 also rotate(s) in the forward direction, rotate in the reverse direction, or stop, and the working vehicle 1 travels forward, rearward, turn left or right, or stops.

Furthermore, switching valve(s) for speed changes of the operating equipment 47 and/or like switch(es) positions according to control signal(s) from the controller 21, thus changing the angle of inclination of the swash plate(s) of the travel motor(s) of the HSTs 46L and/or 46R. With this, the rotation speed of the travel motor(s) increases or decreases, so that the travel speed of the traveling devices 5 and the working vehicle 1 is changed.

The attachment 30 attachable to the working vehicle 1 is provided with a transmitter 33. The transmitter 33 is a beacon transmitter to periodically transmit a wireless signal compliant with a near field communication standard. Specifically, the beacon transmitter 33 is a device to periodically transmit an advertisement signal (also called "advertisement packet" or "beacon signal") which is a wireless signal compliant with Bluetooth (registered trademark) Low Energy. The beacon transmitter 33 looks like a small tag, and is therefore sometimes called a "BLE tag". The beacon transmitter 33 includes a microcomputer, a memory, a transmitter circuit, a battery, a vibration sensor 34, and/or the like. The elements of the beacon transmitter 33 are driven by electricity from the battery. The beacon transmitter 33 transmits the advertisement signal Q1 at interval(s) of, for example, about 1 second to about 3 seconds, but the intervals are not limited to 1 second to 3 seconds and may be selected as appropriate.

Figure 2:
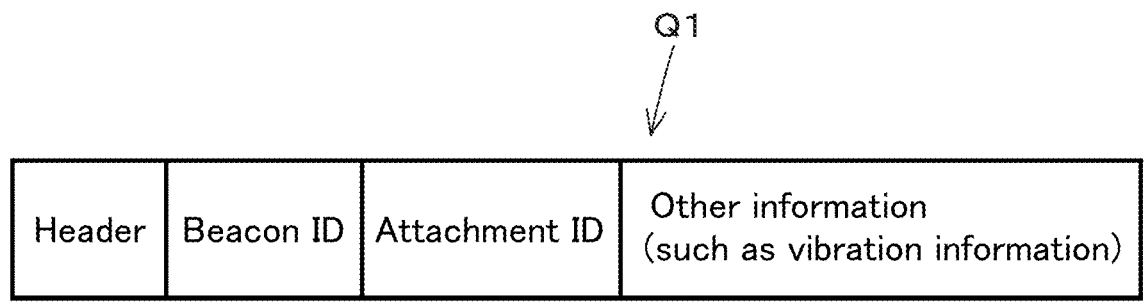
FIG. 2 is a diagram showing an example of information included in an advertisement signal.

FIG. 2 shows an example of information contained in an advertisement signal Q1 transmitted from the beacon transmitter 33. The advertisement signal Q1 includes a header, a beacon ID, an attachment ID, and other information. The beacon ID is identification information of the beacon transmitter 33 which is the sender of the advertisement signal Q1. The attachment ID is identification information of the attachment 30 in or on which the beacon transmitter 33 which is the sender of the advertisement signal Q1 is provided. Note that the attachment ID may be hereinafter simply referred to as identification information.

The other information in the advertisement signal Q1 includes vibration information relating to the vibration state detected by the vibration sensor 34 of the beacon transmitter 33 which is the sender, i.e., vibration information relating to the vibration state of the attachment 30 in or on which the beacon transmitter 33 is provided. The vibration information may include information such as a message indicating whether or not the attachment 30 is vibrating (presence or absence of vibration). The vibration information may include, instead of or in addition to the information such as a message, a vibration indicator (numerical value) indicating the magnitude of vibration detected by the vibration sensor 34. The vibration indicator may be, for example, at least one of the displacement, velocity, or acceleration of vibrations of the attachment 30 detected by the vibration sensor 34. Inertial sensor(s) such as an acceleration sensor and/or a gyroscope sensor may be used as the vibration sensor 34.

The beacon transmitter 33 is attached to a position on the attachment 30 that is specific to the attachment 30. The beacon transmitter 33 is attached to a position appropriate in terms of content of work done by the attachment 30, structure of the attachment 30, and/or the shape of the attachment 30. The beacon transmitter 33 is attached to a position at which the beacon transmitter 33 does not or is relatively unlikely to interfere with the operation of the attachment 30. The beacon transmitter 33 is attached to a position at which the beacon transmitter 33 does not or is relatively unlikely to contact an obstacle depending on the content of work done by the attachment 30. Thus, the beacon transmitter 33 is preferably attached to a portion of the attachment 30 that faces the machine body 2 of the working vehicle 1 (attached to a rear surface of the attachment 30). The beacon transmitter 33 is attached to the attachment 30 via bracket(s) and/or fastener(s).

The beacon scanner 23 is located at, for example, the front portion of the machine body 2 that faces the attachment 30. More specifically, the beacon scanner 23 is provided on the portion of a front portion of the machine body 2 that faces the rear surface of the attachment (provided on a lower portion of the machine body) as illustrated in FIG. 17 or provided on an upper portion of the cabin 3 of the front portion of the machine body 2. The controller 21 is provided in the machine body 2. Since the beacon scanner 23 is provided in or on the machine body 2, it is possible to achieve a configuration in which output signals from the beacon scanner 23 can be inputted into the controller 21 using simple electric wiring or simple communication circuit(s) as compared to cases where the beacon scanner 23 is provided on the movable working device 4.

The advertisement signal Q1 transmitted from the beacon transmitter 33 is received by the beacon scanner 23 of the working vehicle 1. The controller 21 identifies (recognizes) the attachment 30 based on the attachment ID included in the advertisement signal Q1 received by the beacon scanner 23.

In the case where one or more attachments 30 are present in the vicinity of the working vehicle 1, one or more advertisement signals Q1 from one or more beacon transmitters 33 of the one or more attachments 30 are received by the beacon scanner 23. Upon receipt of each advertisement signal Q1, the beacon scanner 23 measures the RSSI of the advertisement signal Q1.

The controller 21 causes the internal memory (memory) 21a to store, for a period of time T4, one or more attachment IDs included in one or more advertisement signals Q1 received by the beacon scanner 23, thus collecting the attachment IDs and RSSIs in the memory 21a. Specifically, the controller 21 causes the memory 21a to store, for a period of time T4, one or more attachment IDs read from one or more advertisement signals Q1 and one or more RSSIs such that the one or more attachment IDs and the one or more RSSIs are associated with each other, thus collecting the one or more attachment IDs and the one or more RSSIs in the memory 21a.

Note that the controller 21 causes the memory 21a to store also piece(s) of information (such as timestamp(s)) relating to the point(s) in time at which the beacon scanner 23 received the advertisement signal(s) Q1 (referred to as receipt time point(s)) and/or the point(s) in time at which the attachment ID(s) and the RSSI(s) were stored (referred to as storage time point(s)) such that the piece(s) of information is/are associated with the attachment ID(s) and the RSSI(s). The present example embodiment is described based on an example case in which the controller 21 causes the memory 21a to store attachment ID(s) and RSSI(s) and at least receipt time point(s) associated with the attachment ID(s) and RSSI(s).

The controller 21 may cause the memory 21a to also store beacon ID(s) and other information included in the received advertisement signal(s) Q1 etc. in association with the attachment ID(s) and RSSI(s).

The controller 21 is configured or programmed to cause the memory 21a to store one or more of the attachment ID(s) included in one or more of the advertisement signal(s) Q1 received by the beacon scanner 23 that are greater (higher) in terms of RSSI than a predetermined value (first predetermined value X), and cause the memory 21a to not store any of the attachment ID(s) included in one or more of the advertisement signal(s) Q1 received by the beacon scanner 23 that are equal to or lower than the predetermined value in terms of RSSI.

Specifically, upon receipt of an advertisement signal Q1 from a beacon transmitter 33 by the beacon scanner 23, the controller 21 acquires the RSSI of the advertisement signal Q1 and compares the RSSI with the first predetermined value X. After comparing the RSSI with the first predetermined value X, the controller 21 reads information from the advertisement signal Q1 if the RSSI thereof is greater than the first predetermined value X, and causes the memory 21a to store the attachment ID and the RSSI. On the contrary, if the RSSI is equal to or less than the first predetermined value X, the controller 21 does not read information from the advertisement signal Q1 and does not cause the memory 21a to store the attachment ID or the RSSI.

The first predetermined value X is a preset threshold which is stored in the storing unit 22. Note that the first predetermined value X may be edited (changed) appropriately by the operator via the user interface 25 or the portable device 70 etc. In such a case, the operator may use the user interface 25 or the portable device 70 etc. to set a specific value of the first predetermined value X, and may select a level (level of the threshold) so that the first predetermined value X corresponding to that level is set.

When an attachment 30 is attached to the quick hitch 16, the controller 21 selects the attachment ID of the attachment 30 attached to the quick hitch 16 from the attachment IDs stored in the memory 21a based on the RSSIs. Specifically, the controller 21 calculates a judgment value (a value based on which a judgment is made) based on the RSSI, and compares the judgment values concerning respective attachment IDs to select an attachment ID. The controller 21 selects the attachment ID(s) that is/are the highest in terms of judgment value. In the present example embodiment, the controller 21 causes the memory 21a to store the attachment ID(s) of advertisement signal(s) Q1 that has/have an RSSI higher than (is/are greater in terms of RSSI than) the predetermined value X, and does not cause the memory 21a to store the attachment ID(s) of advertisement signal(s) Q1 that has/have an RSSI equal to or less than the first predetermined value X (is/are equal to or less than the first predetermined value X in terms of RSSI). This allows the controller 21 to select the attachment ID of the attachment 30 from one or more of the advertisement signal(s) Q1 received by the beacon scanner 23 that have a greater (higher) RSSI than (that are greater (higher) in terms of RSSI than) the predetermined value (first predetermined value X).

The following details the calculation of the judgment value. The controller 21 calculates an elapsed time from when an advertisement signal Q1 is received, and calculates a judgment value based on the RSSI and the elapsed time. That is, the controller 21 selects an attachment ID based on judgment value(s) obtained by assigning weight(s) to RSSI(s) based on the elapsed time(s). In other words, a judgment value is an RSSI' obtained by correcting an RSSI by assigning a weight using the elapsed time. The controller 21 refers to the receipt time point associated with each of the attachment ID(s) stored in the storing unit 22, and calculates the elapsed time from when the advertisement signal Q1 is received based on the receipt time point and the current time point.

The controller 21 calculates the judgment value such that the judgment value concerning the attachment ID calculated by the controller 21 decreases as the elapsed time increases. Specifically, the controller 21 calculates a correction value (first correction value) by multiplying the elapsed time by a coefficient (first coefficient), and calculates a judgment value based on each RSSI from the storing unit 22 and the first correction value. Therefore, the first correction value increases as the elapsed time increases, whereas the first correction value decreases as the elapsed time decreases.

The first coefficient is a preset value which is stored in the storing unit 22. The first coefficient may be defined according to the degree of weighting using the elapsed time. Specifically, in a case that elapsed time (time) is prioritized over RSSI (the distance between the beacon transmitter 33 and the beacon scanner 23, space), the first coefficient need only be defined greater than in a case that RSSI (space) is prioritized over elapsed time (time). Note that the first coefficient may be appropriately edited (changed) by the operator via the user interface 25 or the portable device 70 etc. in the same manner as the first predetermined value X.

The controller 21 calculates a judgment value by subtracting the first correction value from the RSSI of the advertisement signal Q1 when the attachment ID was received. Since the first correction value calculated by the controller 21 increases as the elapsed time increases, the calculated judgment value decreases as the elapsed time increases. On the contrary, since the first correction value calculated by the controller 21 decreases as the elapsed time decreases, the calculated judgment value is larger when the elapsed time is short than when the elapsed time is long.

In the example described above, the controller 21 calculates a judgment value by subtracting the first correction value from RSSI. Note, however, that the method of calculating a judgment value is not limited to the example described above, provided that at least the judgment value calculated by the controller 21 decreases as the elapsed time increases. For example, the controller 21 may calculate a second correction value that differs from the first correction value, and calculate a judgment value by dividing RSSI by the second correction value. In such a case, the storing unit 22 stores a second coefficient that differs from the first coefficient, and the controller 21 calculates the second correction value by multiplying the elapsed time by the second coefficient. However, if the elapsed time is zero when the controller 21 calculates a judgment value by dividing RSSI by the second correction value, the controller 21 uses the RSSI as the judgment value. Therefore, the second correction value increases as the elapsed time increases, and the second correction value decreases as the elapsed time decreases.

The second coefficient is a preset value, and may be defined according to the degree of weighting using the elapsed time. Specifically, in a case that elapsed time (time) is prioritized over RSSI (space), the second coefficient need only be defined greater than in a case that RSSI (space) is prioritized over elapsed time (time), similarly to the first coefficient. Note that the second coefficient may also be appropriately edited (changed) by the operator via the user interface 25 or the portable device 70 etc. in the same manner as the first predetermined value X.

It is only necessary that at least the judgment value calculated by the controller 21 decrease as the elapsed time increases. The controller 21 may be capable of calculating a judgment value using a mathematical expression (function) other than those described above. In such a case, the judgment value calculated by the controller 21 may decrease substantially proportionally, decrease in a curve, or decrease stepwise, as the elapsed time increases.

In the example described above, the elapsed time used by the controller 21 to calculate a judgment value is the elapsed time from when the advertisement signal Q1 is received. Note, however, that the elapsed time is not limited to the period of time from when the advertisement signal Q1 is received, and may be the period of time from when the attachment ID is stored in a memory. In such a case, the controller 21 refers to the storage time point associated with each attachment ID stored in the storing unit 22, and calculates the elapsed time from when the attachment ID is stored in the memory based on the storage time point and the current time point.

In the example described above, the controller 21 selects the attachment ID which is the highest in terms of judgment value. In this regard, if two or more of the attachment IDs stored in the memory 21*a* are the highest in judgment value when the attachment 30 is attached to the quick hitch 16, the controller 21 selects an attachment ID based on elapsed time. Specifically, the controller 21 refers to the elapsed times corresponding to such attachment IDs which are the same in terms of judgment value, and selects the attachment ID which is longest in terms of an elapsed time. In such a case, the controller 21 is capable of selecting an attachment ID using the actual RSSI with priority also in consideration of RSSI (space) and elapsed time (time). However, when the controller 21 prioritizes elapsed time (time) over RSSI (in other words, when the controller 21 prioritizes the attachment ID included in an advertisement signal Q1 received relatively recently, i.e., the attachment ID included in an advertisement signal Q1 received at the point in time that is closest to when the attachment 30 is attached to the quick hitch 16), the controller 21 need only select the attachment ID which is shortest in terms of an elapsed time if there are two or more attachment IDs which are the highest in terms of judgment value. In such a case, switching may be performed by the operator via the user interface 25 or the portable device 70 etc. between (i) selecting an attachment ID, which is longest in terms of an elapsed time, of the attachment IDs which are the same in terms of judgment value and (ii) selecting an attachment ID, which is shortest in terms of an elapsed time, of the attachment IDs which are the same in terms of judgment value.

The controller 21 then identifies the specifications and/or the like of the attachment 30 attached to the quick hitch 16 based on the selected attachment ID, and starts a predetermined process according to the attachment ID.

An example of the predetermined process is a process in which the controller 21 causes the user interface 25 to output (display) information indicating that the attachment 30 corresponding to the selected attachment ID is attached to the quick hitch 16 (working vehicle 1). Another example of the predetermined process is a process in which the controller 21 controls output of hydraulic fluid (power) to the attachment 30 attached to the quick hitch 16 (controls start and stop of the supply of hydraulic fluid to the attachment 30) according to the selected attachment ID. It is noted here that the controller 21 may also control at least one of the introduction of hydraulic fluid from the attachment 30, the amount of hydraulic fluid supplied to the attachment 30, or the pressure of hydraulic fluid supplied to the attachment 30.

With the attachment usage system 100, the controller 21 selects the ID of the attachment 30 attached to the quick hitch 16 from the attachment ID(s) stored in the memory 21*a* and starts a predetermined process according to the selected ID. The controller 21 identifies the attachment 30 attached to the quick hitch 16 based on the attachment ID selected based on a predetermined condition from the attachment ID(s) stored in the memory 21*a*.

Display data and control data are pre-set for each of the attachment IDs of attachments 30 attachable to the quick hitch 16, i.e., attachments 30 which can be used with the working vehicle 1.

FIG. 3 is a table showing an example of the relationship between the attachment IDs of the attachments 30 attachable to the quick hitch 16 and pieces of display data corresponding to the attachments 30. A piece of display data is data based on which the user interface 25 displays information about a corresponding attachment 30. The display data includes, for example, an icon, name, and specifications of the corresponding attachment 30. Such an attachment ID and display data of the attachment 30 are stored in a predetermined storage area of the storing unit 22 such that the attachment ID and the display data of the attachment 30 are associated with each other. Note that display data other than that described above may be stored in the storing unit 22 such that the display data is associated with the attachment ID.

FIG. 4 is a table showing an example of the relationship between the attachment IDs of the attachments 30 attachable to the quick hitch 16 and pieces of control data corresponding to the attachments 30. A piece of control data indicates control performed by the working vehicle 1 according to what attachment 30 is used. The control data includes, for example, the level of the amount of hydraulic fluid supplied to the corresponding attachment 30. Such an attachment ID and control data of the attachment 30 are stored in a predetermined storage area of the storing unit 22 such that the attachment ID and the control data of the attachment 30 are associated with each other. Note that other control data, such as the level of hydraulic pressure outputted to the attachment 30 and/or the output value of power other than hydraulic fluid, may be stored in the storing unit 22 such that the control data is associated with the attachment ID.

Figure 5:
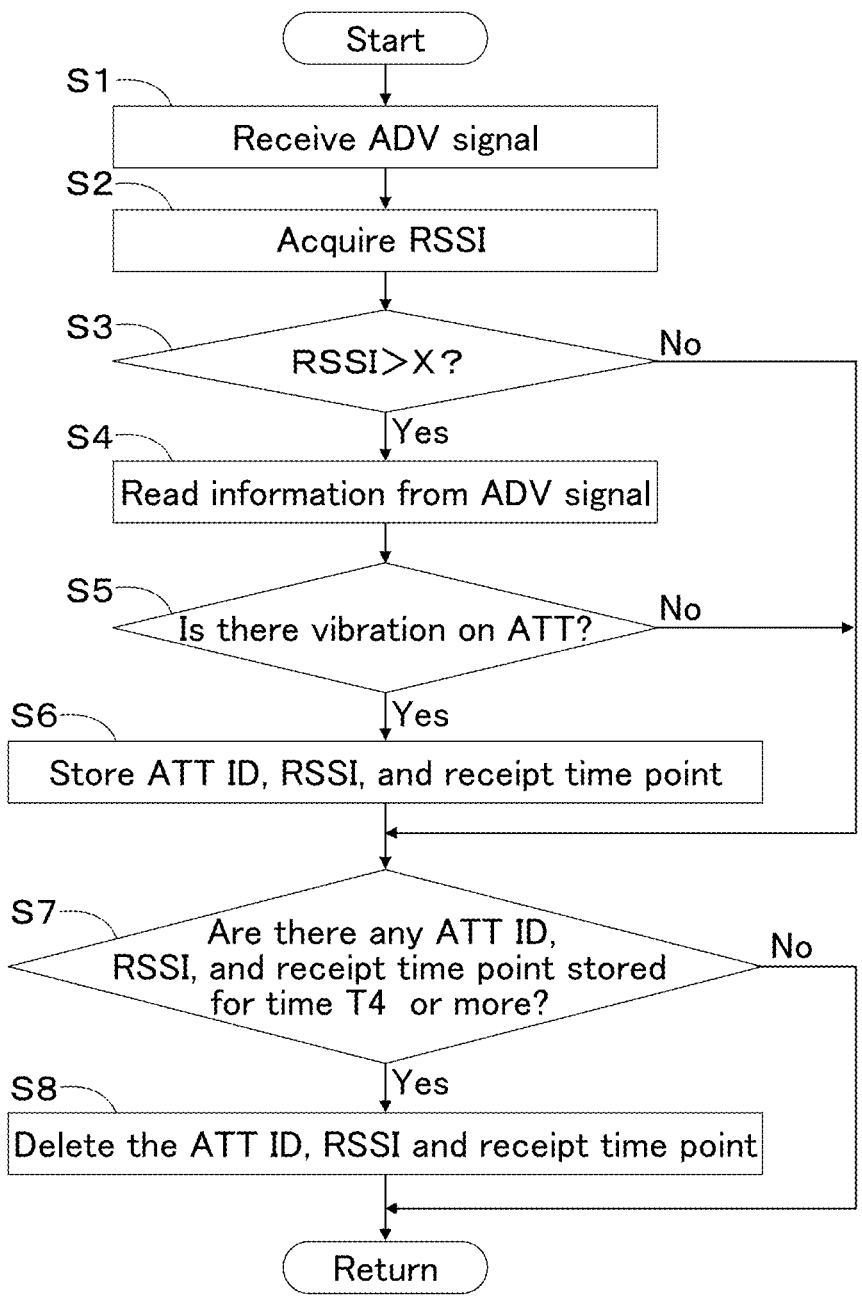
FIG. 5 is a flowchart showing an example of an attachment information collecting process.

FIG. 5 is a flowchart showing an example of an attachment information collecting process. The attachment information collecting process is performed by the controller 21 of the working vehicle 1 based on software program(s) stored in the memory 21*a* or the storing unit 22. The same applies to a securing-of-attachment recognizing process and a selection-of-attachment confirming process (described later). In FIG. 5, the advertisement signal Q1 is referred to as "ADV signal" and the attachment 30 is referred to as "ATT" for convenience of description. The same applies to FIGS. 7, 9 to 12, and 14 to 16 (described later).

Upon receipt of an advertisement signal Q1 from the beacon transmitter 33 by the beacon scanner 23 (S1), the controller 21 acquires the RSSI of the advertisement signal Q1 from the beacon scanner 23 (S2). Next, if the acquired RSSI is greater than a first predetermined value X (YES in S3), the controller 21 reads information from the received advertisement signal Q1 (S4).

Next, if the information read from the advertisement signal Q1 includes vibration information indicating that the attachment 30 is vibrating, the controller 21 determines that there is vibration on the attachment 30 (YES in S5). Alternatively, if the information read from the advertisement signal Q1 includes a vibration indicator and the vibration indicator is greater than a predetermined value (second predetermined value) Y, the controller 21 determines that there is vibration on the attachment 30 (YES in S5).

Next, the controller 21 causes the memory 21*a* to store the attachment ID included in the received advertisement signal Q1, the RSSI of the advertisement signal Q1, and the time point at which the advertisement signal Q1 was received (receipt time point) such that the attachment ID, the RSSI, and the receipt time point are associated with each other (S6).

In contrast, if the RSSI is equal to or less than the predetermined value X (NO in S3), the controller 21 does not cause the memory 21*a* to store the attachment ID included in the received advertisement signal Q1, the RSSI of the advertisement signal Q1, or the receipt time point. Also if the received advertisement signal Q1 does not include vibration information indicating that the attachment 30 is vibrating (or the vibration indicator greater than the predetermined value Y) and it is determined that there is no vibration on the attachment 30 (NO in S5), the controller 21 does not cause the memory 21*a* to store the attachment ID included in the received advertisement signal Q1, the RSSI of the advertisement signal Q1, or the receipt time point.

If any of the attachment ID(s), RSSI(s), and receipt time point(s) in the memory 21*a* have been stored for the period of time T4 or more (YES in S7), the controller 21 deletes that attachment ID(s), RSSI(s), and receipt time point(s) from the memory 21*a* (S8). It is noted here that the controller 21 also deletes, from the memory 21*a*, other information (such as storage time point) corresponding to the attachment ID(s) having been stored for the period of time T4 or more. The period of time T4 is, for example, about 30 seconds which corresponds to at least one of the time for an attachment 30 to be attached to the working vehicle 1 or the time for the attachment 30 to be replaced with another one. After step S8, the controller 21 repeats step S1 and subsequent steps.

Figure 6:
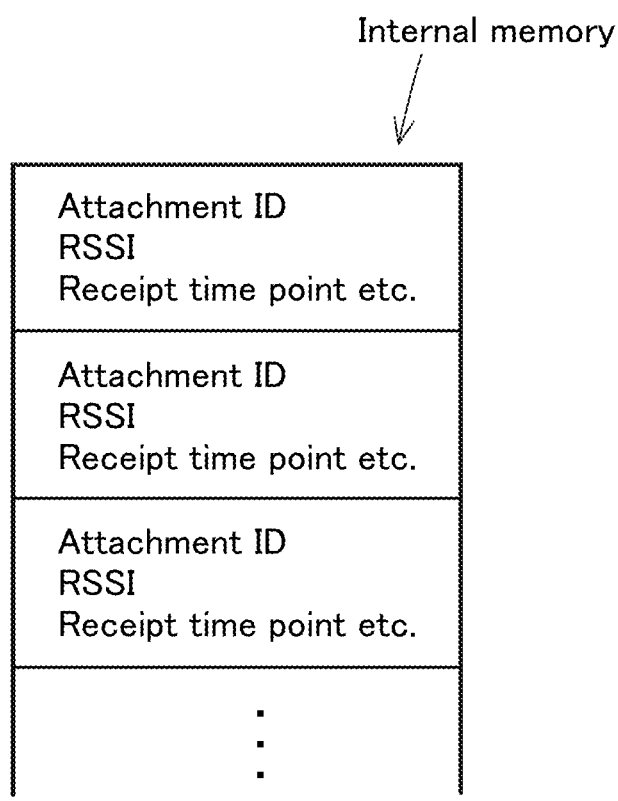
FIG. 6 is a diagram showing an example of information stored in an internal memory of a controller.

FIG. 6 shows information stored in the memory 21*a* of the controller 21. The controller 21 repeats the attachment information collecting process shown in FIG. 5, so that attachment IDs, RSSIs, and receipt time points are collected in the memory 21*a* as shown in FIG. 6.

Specifically, the controller 21 selects one of the advertisement signal(s) Q1 that is received by the beacon scanner 23 from the beacon transmitter 33 on the attachment 30 which is located close to the quick hitch 16 (working vehicle 1) to some extent and which has vibrated when attached to the quick hitch 16. The attachment ID included in the selected advertisement signal Q1, the RSSI of that advertisement signal Q1, and the receipt time point at which the advertisement signal Q1 was received are stored (collected) in the memory 21*a* of the controller 21 for the period of time T4. For another example, the controller 21 may cause the storing unit 22 to store the attachment ID, the RSSI, and the receipt time point for the period of time T4.

When an attachment 30 placed on the ground or the like is to be attached to the working vehicle 1, the operator of the working vehicle 1 operates the traveling device 5 and/or the working device 4 using the operation member(s) 6 and/or 7 to allow the front plates 50*f* of the brackets 50 of the quick hitch 16 to engage with the base plate 71 of the attachment 30, thus holding the attachment 30 with the brackets 50 (see FIG. 19A). In so doing, in some cases, the operator allows the front plates 50*f* to engage with the base plate 71 and then allow the booms 11 and/or the quick hitch 16 to swing upward by a predetermined angle using the work operation member 7 to raise the attachment 30 with the working device 4 to some extent to check whether the attachment 30 is held by the brackets 50.

Then, if the operator operates the attaching switch 26 for the first predetermined period of time T1 or more, the controller 21 causes the latch cylinder 52 to extend. With this, the latch levers 57 pivot downward, so that the latch pins 54 are inserted into the through-holes 71*h* of the base plate 71 of the attachment 30 to allow the attachment 30 to be latched by the latching mechanisms 51 (see FIG. 19B). That is, the attachment 30 is brought into a state in which it is attached to the quick hitch 16 and the working vehicle 1.

During the steps of attaching the attachment 30 described above, the attachment 30 vibrates, for example, when the front plates 50*f* of the brackets 50 are brought into engagement with the base plate 71 of the attachment 30, when the attachment 30 is raised by the working device 4, and/or when the attachment 30 is latched by the latching mechanisms 51. The advertisement signal Q1 transmitted by the beacon transmitter 33 includes vibration information relating to the vibration state of the attachment 30 that has been detected by the vibration sensor 34 at any of the above-listed points in time.

Figure 7:
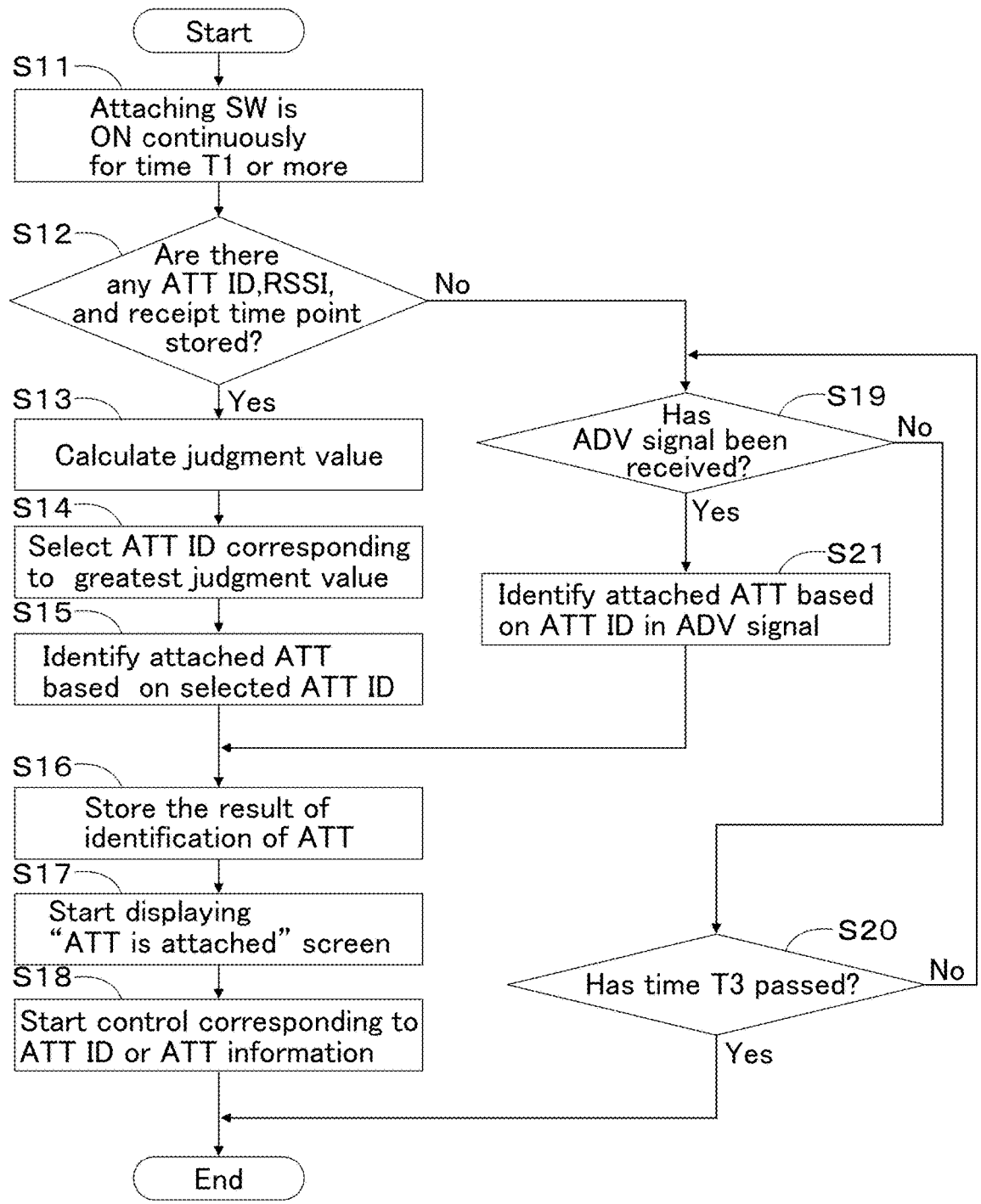
FIG. 7 is a flowchart showing an example of a securing-of-attachment recognizing process.

FIG. 7 is a flowchart showing an example of the securing-of-attachment recognizing process. If the attaching switch 26 is operated continuously (continues to be in ON state) for a first predetermined period of time T1 or more (S11 in FIG. 7) as described earlier, the controller 21 determines that the attachment 30 is attached to (secured to) the quick hitch 16. Next, the controller 21 determines whether or not any attachment IDs, RSSIs, and/or receipt time points are stored in the memory 21*a*.

If the memory 21*a* stores at least one attachment ID, at least one RSSI corresponding to the least one attachment ID, and at least one receipt time point at which the at least one advertisement signal Q1 including the at least one attachment ID was received (YES in S12), the controller 21 reads the RSSI and receipt time point from the memory 21a and calculates a judgment value (S13). The controller 21 calculates the elapsed time from when the advertisement signal Q1 is received based on the receipt time point and the current time point, and calculates a judgment value by subtracting, from the RSSI, the correction value obtained by multiplying the elapsed time by a coefficient (first coefficient).

After calculating the judgment value concerning each attachment ID stored in the memory 21a (S13), the controller 21 selects one or more of the attachment ID(s) stored in the memory 21a that correspond to the greatest judgment value (S14). In step S14, if two or more of the attachment IDs stored in the memory 21a are the highest in terms of judgment value, the controller 21 selects an attachment ID based on elapsed time.

Next, the controller 21 identifies (recognizes) the attachment 30 attached to the quick hitch 16 based on the selected attachment ID (S15).

The one or more of the advertisement signals Q1 received by the beacon scanner 23 that are greatest in terms of a judgment value are one or more signals selected in consideration of both RSSI (space) and elapsed time (time). Therefore, such an advertisement signal Q1 which is greatest in terms of a judgment value is a signal having a relatively high RSSI and transmitted from a beacon transmitter 33 located relatively close to the beacon scanner 23 or a signal relatively short in terms of elapsed time and transmitted from a beacon transmitter 33 at a point in time that is relatively closer to the point in time at which the quick hitch 16 is attached to the attachment 30.

Therefore, the controller 21 regards, as the ID of the attachment 30 attached to the quick hitch 16, the attachment ID included in an advertisement signal Q1 which is greatest in terms of a judgment value of advertisement signals Q1 received by the beacon scanner 23 during the period of time T4 which ended when the attachment 30 was attached to the quick hitch 16, and selects that attachment ID. Next, the controller 21 identifies the type, other specifications, and/or the like of the attachment 30 attached to the quick hitch 16 based on the selected attachment ID.

Next, the controller 21 causes the storing unit 22 to store the result of identification of the attachment 30 (S16). It is noted here that the controller 21 causes the storing unit 22 to store information indicating that the identified attachment 30 is attached to the quick hitch 16, i.e., to the working vehicle 1, and the attachment ID of the attached attachment 30.

The controller 21 starts a display process (predetermined process) in which the controller 21 causes the user interface 25 to display (output) an "attachment is attached" screen G1 which indicates that the attachment 30 corresponding to the selected attachment ID is attached and which displays attachment information relating to the attached attachment 30 (S17).

Figure 8:
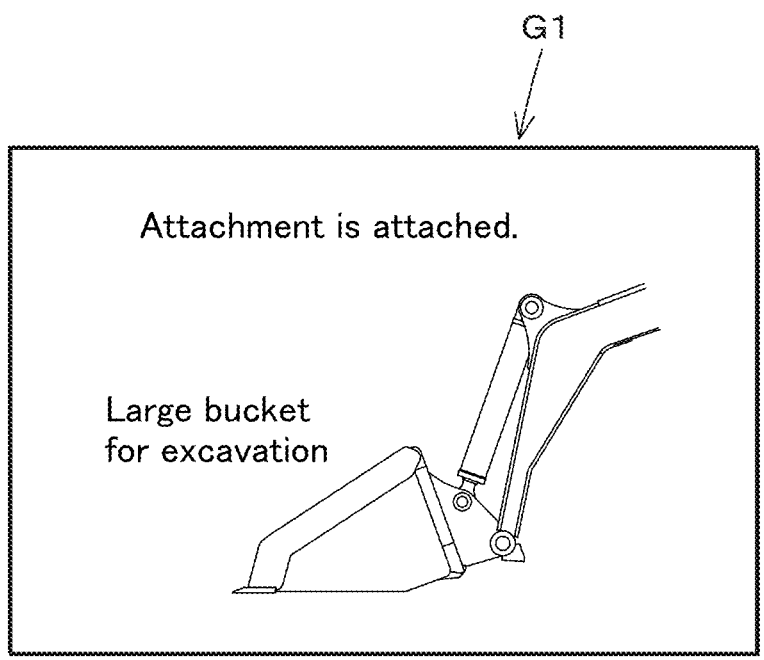
FIG. 8 illustrates an example of an "attachment is attached" screen.

FIG. 8 illustrates an example of the "attachment is attached" screen G1. The "attachment is attached" screen G1 displays a message indicating that the attachment 30 is attached, the attachment information relating to the attached attachment 30, and an icon of the attachment 30. In the example in FIG. 8, the attachment information "Large bucket" "for excavation" is displayed. Additionally or alternatively, other attachment information such as the attachment ID, size, and/or manufacturer of the attachment 30 may be displayed. The display data for the "attachment is attached" screen G1 and the attachment information are prestored in the storing unit 22.

For another example, the controller 21 may cause the communicator 24 (FIG. 1) to transmit, to the portable device 70, the display data for the "attachment is attached" screen G1 and the attachment information of the attachment 30 which has been determined as being attached so that the "attachment is attached" screen G1 is displayed on a display of the portable device 70.

The controller 21 starts predetermined control (predetermined process) according to the attachment ID selected in step S14 (S18). In so doing, the controller 21 reads control data corresponding to the selected attachment ID form the storing unit 22 and starts control corresponding to the attachment 30 attached to the quick hitch 16 based on the control data.

Specifically, in the case where the attachment 30 attached to the quick hitch 16 is an attachment 30b including a hydraulic actuator such as a skid cutter, the controller 21 starts causing the control valve 40d to control the output of hydraulic fluid from the hydraulic fluid outlet port 18a to the attachment 30b, based on the control data read from the storing unit 22. With this, draining of return fluid to be introduced from the attachment 30b into the hydraulic fluid inlet port 18b is also started. The controller 21 may, for example, cause the "attachment is attached" screen G1 to display a message indicating that the control of the output of hydraulic fluid to the attachment 30b has been started.

Note that, in the case where the attachment 30 attached to the quick hitch 16 is an attachment 30 including no hydraulic actuators such as a bucket 30a, the controller 21 does not cause the control valve 40d to output hydraulic fluid from the hydraulic fluid outlet port 18a to the attachment 30 based on the control data read from the storing unit 22. The controller 21 may start control such as adjusting and/or limiting the travel speed and/or speed stage of the working vehicle 1 and/or the height of the raised/lowered booms 11 according to the selected attachment ID in step S18.

On the contrary, if the memory 21a stores no attachment IDs, RSSIs, or receipt time points (NO in S12), the controller 21 determines whether or not the beacon scanner 23 has received any advertisement signals Q1 from beacon transmitter(s) 33. For example, assume that the beacon scanner 23 receives an advertisement signal Q1 within a third predetermined period of time T3 (NO in S20) from when the attaching switch 26 has been operated continuously for the first predetermined period of time T1 or more (S11) (YES in S19). In such a case, the controller 21 identifies the attachment 30 attached to the quick hitch 16 based on the attachment ID included in this advertisement signal Q1 (S21). Next, the controller 21 causes the storing unit 22 to store the result of identification of the attachment 30 as described earlier (S16), and starts a predetermined process according to the attachment ID included in the received advertisement signal Q1 (S17, S18).

For another example, in the case where the beacon scanner 23 receives a plurality of advertisement signals Q1 within the third predetermined period of time T3 (YES in S19), the controller 21 may determine at least one of whether the advertisement signals Q1 have an RSSI higher than a first predetermined value X or whether the advertisement signals Q1 include vibration information indicating that the corresponding attachment 30 is vibrating. The controller 21 may, if the RSSI of any of the advertisement signals Q1 is higher than a predetermined value X and/or any of the advertisement signals Q1 includes vibration information indicating that the attachment 30 is vibrating, identify the attachment 30 attached to the quick hitch 16 based on the attachment ID included in that advertisement signal Q1 (S21). The controller 21 may cause the storing unit 22 to store the result of identification of the attachment 30 (S16) and start a predetermined process according to the attachment ID included in the advertisement signal Q1 (S17, S18).

In the attachment information collecting process shown in FIG. 5, the controller 21 selects one of the advertisement signals Q1 received by the beacon scanner 23 that has an RSSI higher than first predetermined value X and that includes vibration information indicating that the attachment 30 is vibrating (YES in S3, YES in S5), and causes the memory 21a to store (collect) only the attachment(s) ID included in such advertisement signal(s) Q1 (S6). Note, however, that the controller 21 may, in the case where it is determined that the RSSI of the advertisement signal Q1 received by the beacon scanner 23 is higher than the first predetermined value X, cause the memory 21a to store the attachment ID(s) included in such advertisement signal(s) Q1 irrespective of vibration information.

Figure 9:
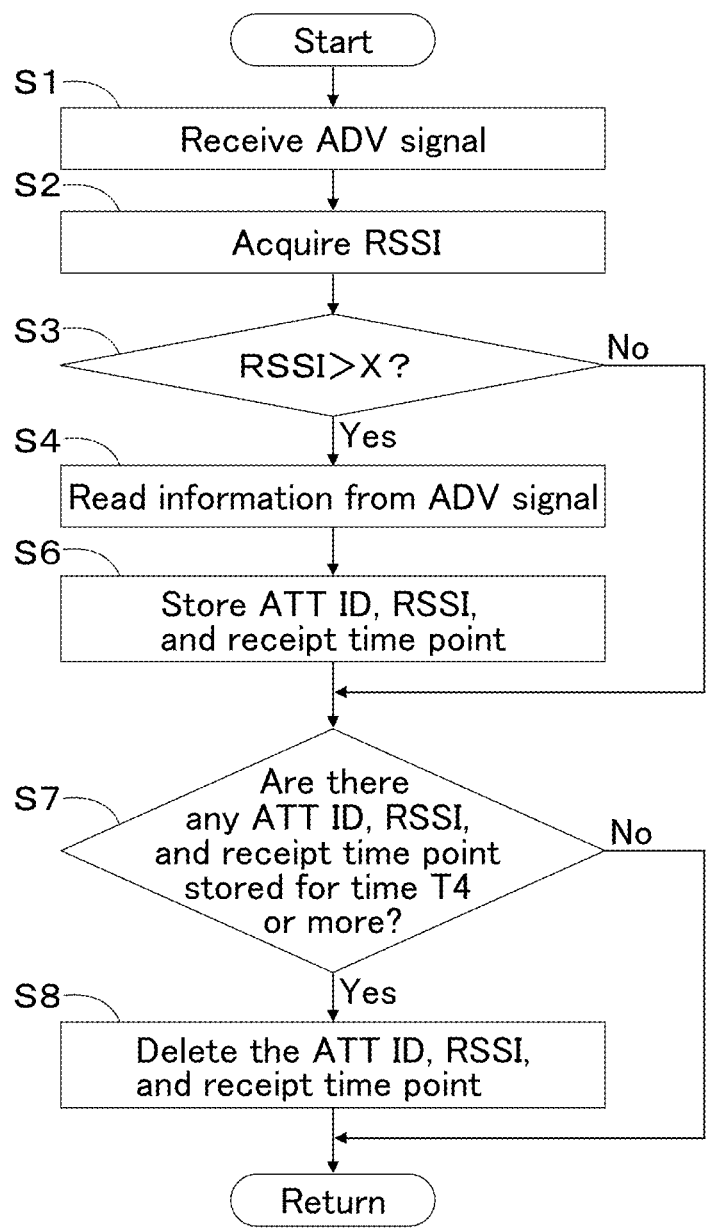
FIG. 9 is a flowchart showing another example of the attachment information collecting process.

Specifically, as shown in FIG. 9, the controller 21 may select one or more of the advertisement signal(s) Q1 received by the beacon scanner 23 that have an RSSI higher than the first predetermined value X (YES in S3) and cause the memory 21a to store only the attachment ID(s) included in the one or more advertisement signals Q1 (S4, S6).

Figure 10:
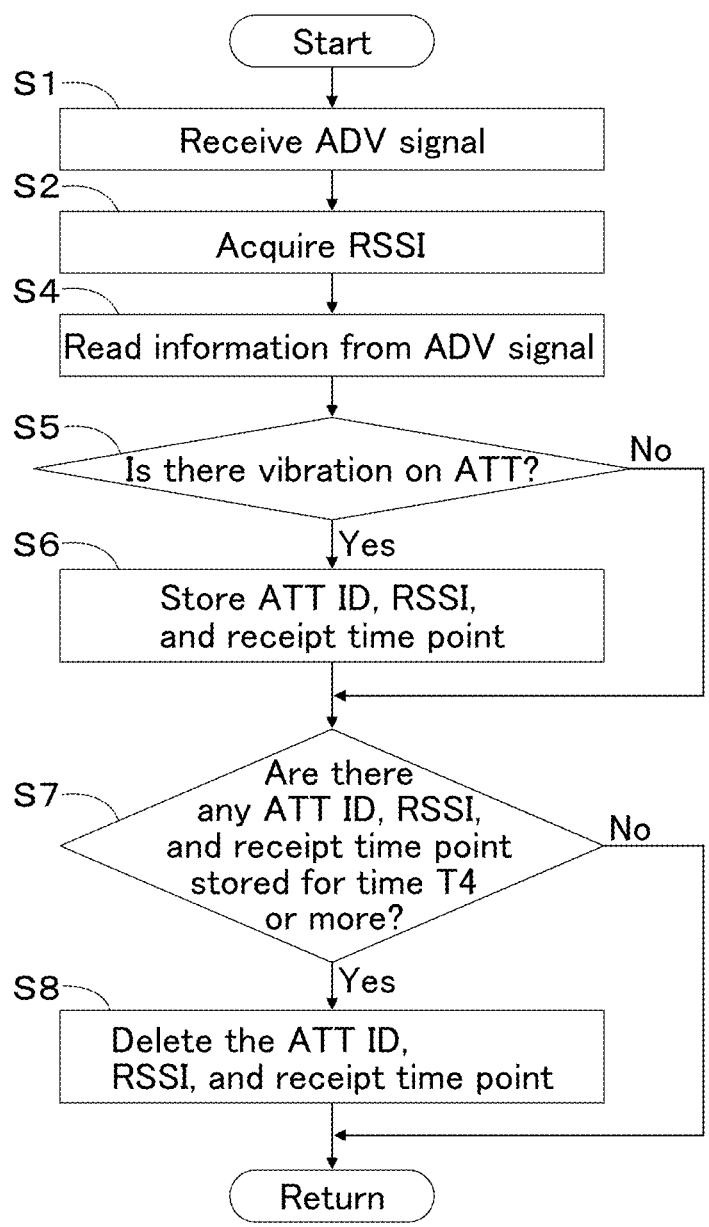
FIG. 10 is a flowchart showing another example of the attachment information collecting process.

As shown in FIG. 10, the controller 21 may select one or more of the advertisement signal(s) Q1 received by the beacon scanner 23 that include vibration information indicating that the attachment 30 is vibrating (YES in S5) and cause the internal memory 21a to store only the attachment ID(s) included in the one or more advertisement signals Q1 (S6). In the case where the attachment information collecting process is performed as shown in FIG. 9 or FIG. 10, the controller 21 may perform the securing-of-attachment recognizing process as discussed with reference to FIG. 7.

For another example, the controller 21 may be configured or programmed to cause the memory to store one or more of the attachment ID(s) included in one or more of the advertisement signal(s) Q1 received by the beacon scanner 23 that are higher in terms of judgment value than a predetermined value (third predetermined value Z) and cause the memory to not store any of the attachment ID(s) included in one or more of the advertisement signal(s) Q1 received by the beacon scanner 23 that are equal to or lower than the predetermined value in terms of judgment value, irrespective of the RSSI of each advertisement signal Q1 received by the beacon scanner 23.

The third predetermined value Z is a preset threshold which is stored in the storing unit 22. Note that the third predetermined value Z may be edited (changed) appropriately by the operator via the user interface 25 or the portable device 70, etc., in the same manner as the first predetermined value X.

Figure 11:
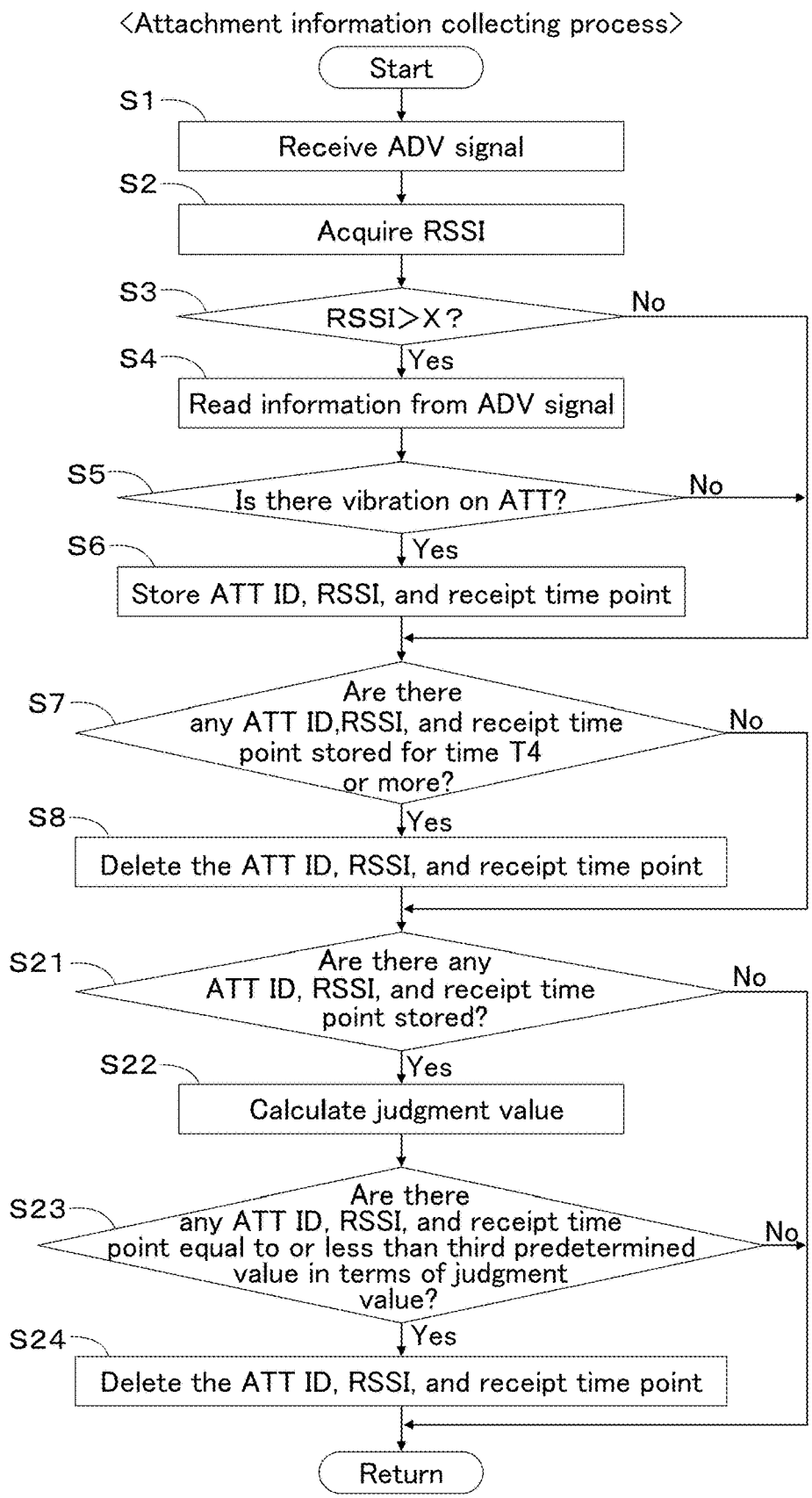
FIG. 11 is a flowchart showing another example of the attachment information collecting process.

Specifically, as shown in FIG. 11, after performing steps S7 and S8, the controller 21 determines whether the memory 21a stores at least one attachment ID, at least one RSSI corresponding to the least one attachment ID, and at least one receipt time point at which the at least one advertisement signal Q1 including the at least one attachment ID was received (S21). If the memory 21a stores at least one attachment ID, at least one RSSI, and at least one receipt time point (YES in S21), the controller 21 reads the RSSI and receipt time point from the memory 21a and calculates a judgment value corresponding to each attachment ID (S22). If the memory 21a stores any attachment ID, RSSI, and receipt time point with a judgment value of the third predetermined value Z or less (YES in S23), the controller 21 deletes the attachment ID, RSSI, and receipt time point from the memory 21a (S24).

In such a case, the controller 21 also deletes, from the memory 21a, other information (such as storage time point) corresponding to the attachment ID with a judgment value of the third predetermined value Z or less. After steps S21 to S24, the controller 21 repeats step S1 and subsequent steps. With this, the controller 21 causes the memory 21a to store attachment ID(s) of advertisement signal(s) Q1 with a judgment value greater than the third predetermined value Z, and does not cause the memory 21a to store attachment ID(s) of advertisement signal(s) Q1 with a judgment value of the third predetermined value Z or less. This allows the controller 21 to select the attachment ID of the attachment from those included in one or more of the advertisement signal(s) Q1 received by the beacon scanner 23 that are greater (higher) in terms of judgment value than a predetermined value (third predetermined value Z).

Note that, in the example shown in FIG. 11, the controller 21 performs steps S21 to S24 after performing steps S7 to S8. Note, however, that the controller 21 may perform steps S7 to S8 after performing steps S21 to S24.

Figure 12:
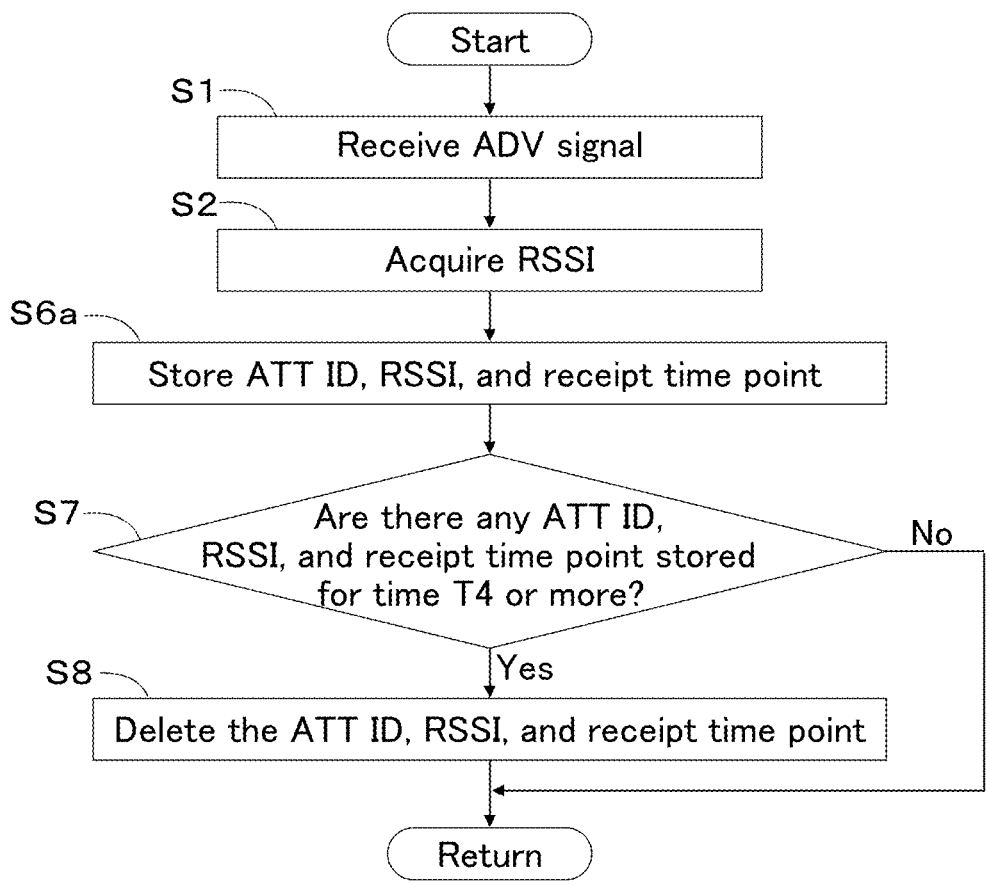
FIG. 12 is a flowchart showing another example of the attachment information collecting process.

For another example, the controller 21 may cause the memory 21a to store the attachment ID(s) included in all the advertisement signal(s) Q1 received by the beacon scanner 23 from the beacon transmitter(s) 33. Specifically, for example, as shown in FIG. 12, after the controller 21 receives advertisement signal(s) Q1 (S1) and acquires the RSSI(s) of the advertisement signal(s) Q1 (S2), the controller 21 causes the memory 21a to store information such as the attachment ID and vibration information included in each advertisement signal Q1, the RSSI of the advertisement signal Q1, and the receipt time point at which the advertisement signal Q1 was received such that the information, the RSSI, and the receipt time point are associated with each other (S6a).

Figure 13:
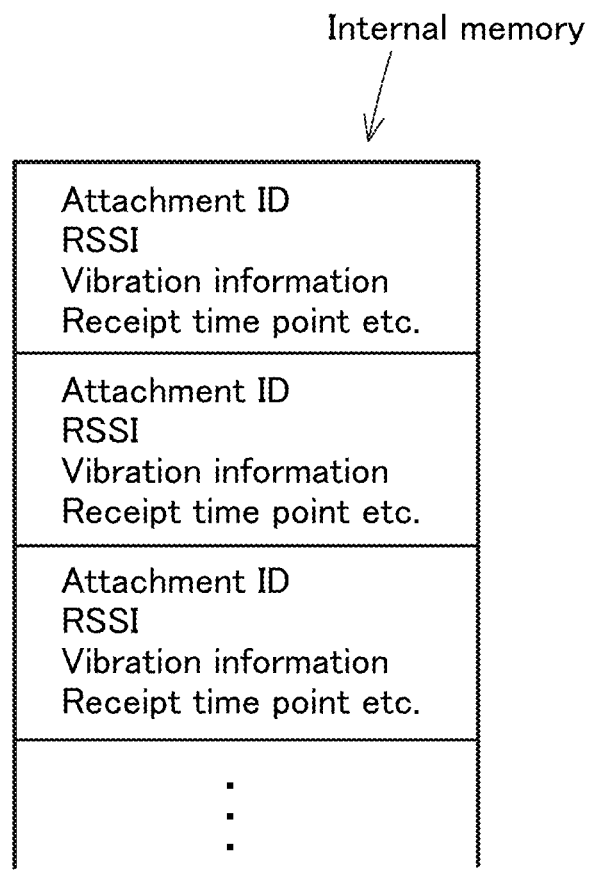
FIG. 13 is a diagram showing another example of information stored in the internal memory of the controller.

With this, as shown in FIG. 13, the attachment IDs and pieces of vibration information included in all the advertisement signals Q1 received by the beacon scanner 23 are collected in the memory 21a such that the attachment IDs and the pieces of vibration information are associated with the receipt time points. In such a case, the controller 21 may perform the securing-of-attachment recognizing process as shown in FIGS. 14 to 16, for example.

Figure 14:
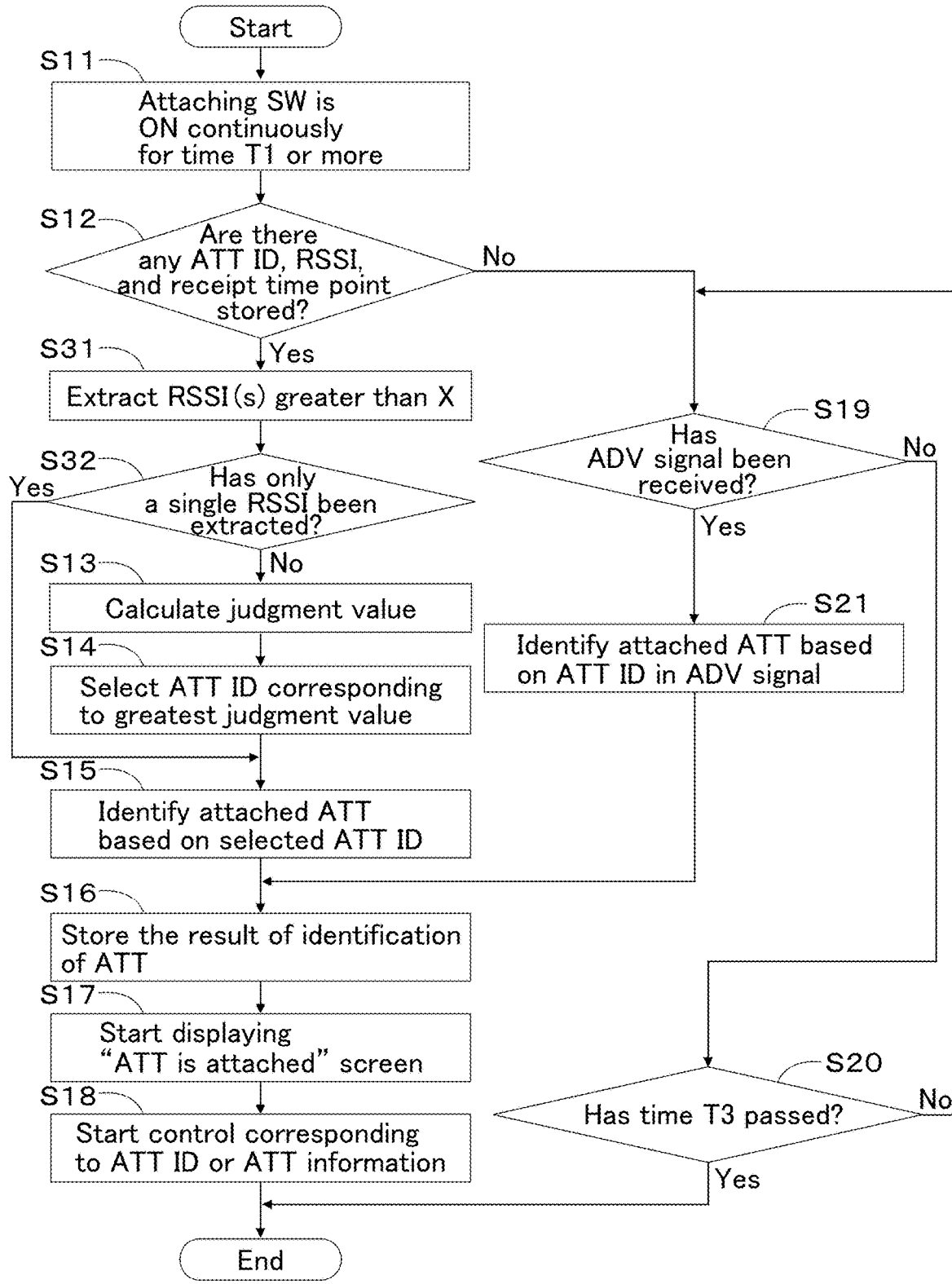
FIG. 14 is a flowchart showing another example of the securing-of-attachment recognizing process.

In FIG. 14, in the case where the memory 21a stores attachment ID(s), RSSI(s), and receipt time point(s) (YES in S12), the controller 21 extracts one or more of the RSSI(s) stored in the memory 21a that are higher than the first predetermined value X (S31). If a single RSSI is extracted (YES in S32), the controller 21 selects the attachment ID corresponding to that RSSI from the memory 21a (S14) and identifies the attachment 30 attached to the quick hitch 16 based on the attachment ID (S15).

In contrast, if two or more RSSIs are extracted (NO in S32), the controller 21 reads the RSSIs and receipt time points from the memory 21a, calculates judgment values (S13), and selects one of the attachment IDs that corresponds to the greatest judgment value (S14).

Figure 15:
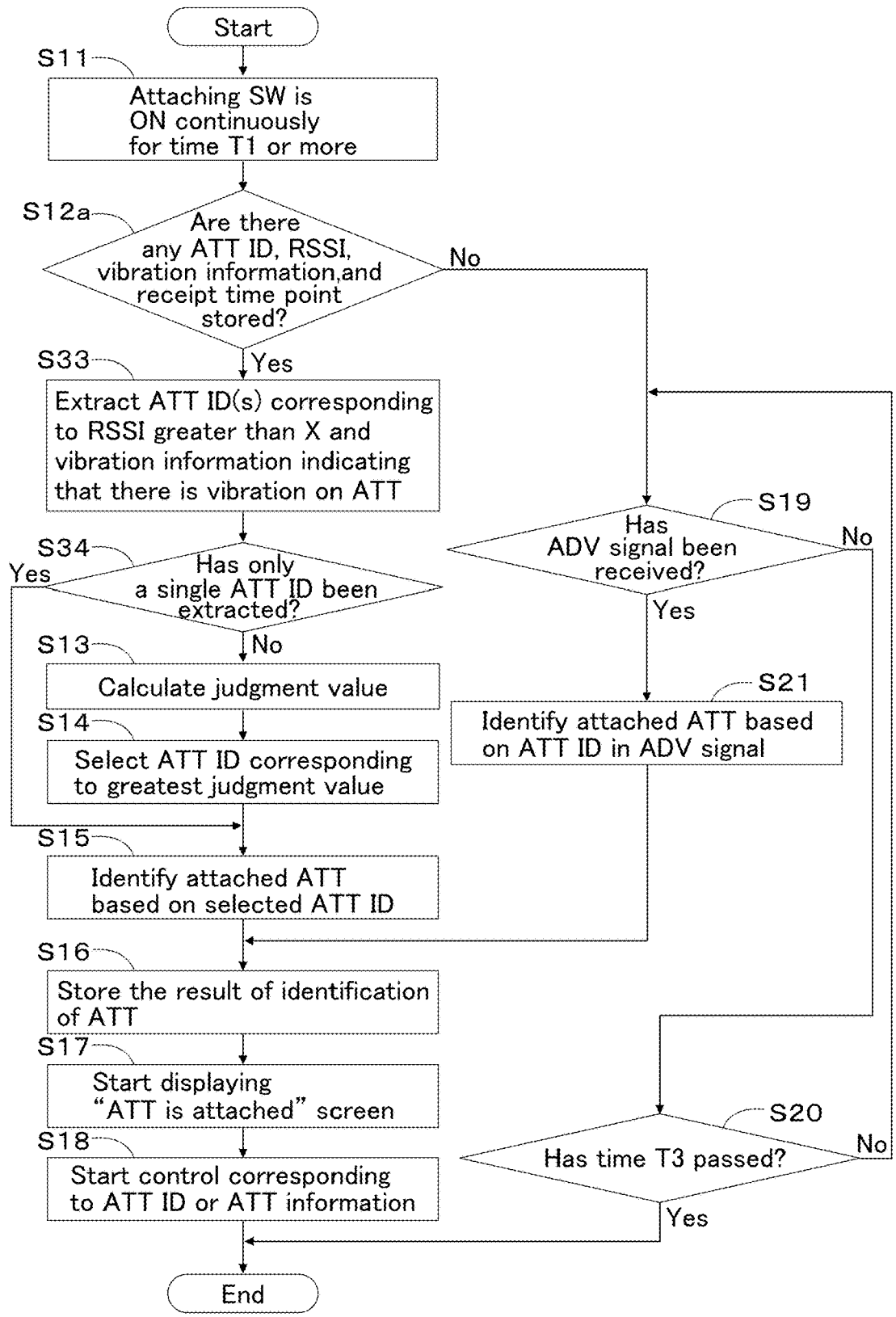
FIG. 15 is a flowchart showing another example of the securing-of-attachment recognizing process.
Figure 16:
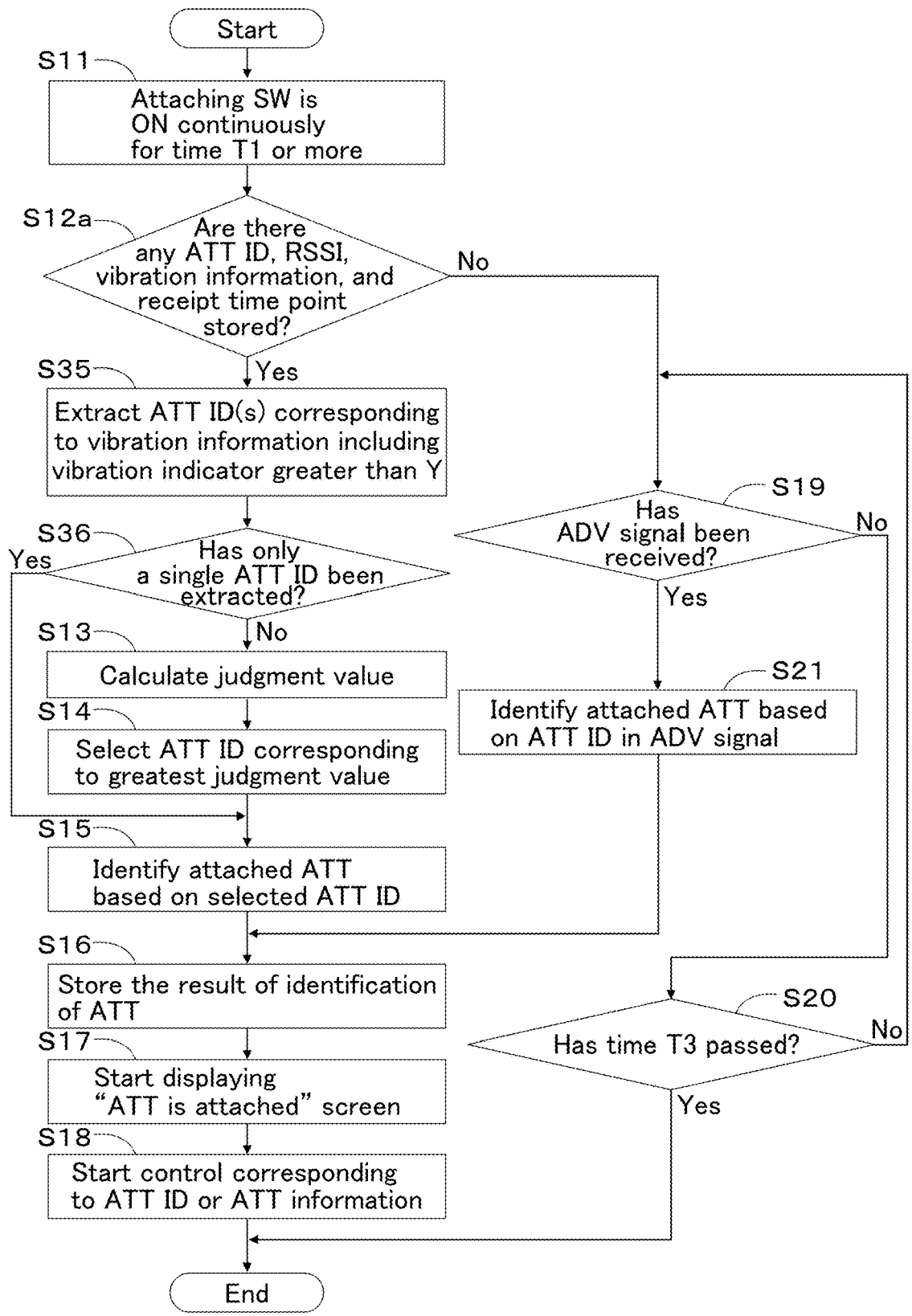
FIG. 16 is a flowchart showing another example of the securing-of-attachment recognizing process.

In FIG. 15, in the case where the memory 21a stores attachment ID(s), RSSI(s), piece(s) of vibration information, and receipt time points (YES in S12a), the controller 21 extracts one or more of the attachment ID(s) that correspond to RSSI(s) higher than the first predetermined value X and correspond to piece(s) of vibration information indicating that the corresponding attachment 30 is vibrating (S33). If a single attachment ID is extracted (YES in S34), the controller 21 identifies the attachment 30 attached to the quick hitch 16 based on that attachment ID (S15). That is, the controller 21 selects the extracted attachment ID as the attachment ID of the attachment 30 attached to the quick hitch 16.

In contrast, if two or more attachment IDs are extracted (NO in S34), the controller 21 reads the RSSIs and receipt time points corresponding to the extracted attachment IDs from the memory 21a and calculates judgment values (S13), and selects an attachment ID that corresponds to the greatest judgment value (S14). Next, the controller 21 identifies the attachment 30 attached to the quick hitch 16 based on the selected attachment ID (S15).

In FIG. 16, if the memory 21a stores attachment ID(s), RSSI(s), vibration information, and receipt time point(s) (YES in S12a), the controller 21 extracts attachment ID(s) corresponding to vibration information including a vibration indicator greater than the second predetermined value Y from the attachment ID(s) in the memory 21a (S35). Next, if a single attachment ID is extracted (YES in S36), the controller 21 identifies the attachment 30 attached to the quick hitch 16 based on that attachment ID (S15). That is, the controller 21 selects the extracted attachment ID as the attachment ID of the attachment 30 attached to the quick hitch 16.

In contrast, if two or more attachment IDs are extracted (NO in S36), the controller 21 reads the RSSIs and receipt time points corresponding to the extracted attachment IDs from the memory 21a and calculates judgment values (S13), and selects an attachment ID that corresponds to the greatest judgment value (S14). The controller 21 then identifies the attachment 30 attached to the quick hitch 16 based on the selected attachment ID (S15).

In the securing-of-attachment recognizing process in FIGS. 14 to 16, after the controller 21 performs step S15, the controller 21 causes the result of identification of the attachment 30 to be stored as described earlier (S16) and starts a predetermined process corresponding to the selected attachment ID (S17, S18). In the case where the memory 21a stores no attachment IDs etc. (NO in S12, NO in S12a), the controller 21 performs steps S19 to S21 as described earlier.

A working vehicle 1 as has been described includes a hitch 16 to attach and detach an attachment 30 thereto and therefrom, a receiver 23 to receive one or more wireless signals Q1 which are transmitted periodically from one or more transmitters 33 in or on one or more of the attachments 30, which include respective one or more pieces of identification information of the one or more attachments 30, and which are compliant with a near field communication standard, and a controller 21 configured or programmed to select a piece of identification information of the attachment 30 attached to the hitch 16 based on the one or more pieces of identification information included in the one or more wireless signals Q1 received by the receiver 23 and on one or more received signal strengths of the one or more wireless signals Q1, and perform a predetermined process based on the selected piece of identification information, wherein the controller 21 is configured or programmed to cause a memory 21a to store, for a period of time T4, the one or more pieces of identification information included in the one or more wireless signals Q1 received by the receiver 23, calculate one or more elapsed times from when the one or more wireless signals Q1 including the one or more pieces of identification information are received or one or more elapsed times from when the one or more pieces of identification information are stored in the memory 21a, calculate one or more judgment values based on the one or more received signal strengths of the one or more wireless signals Q1 at one or more points in time at which the one or more pieces of identification information are received and on the one or more elapsed times, and select, based on the one or more judgment values, the piece of identification information of the attachment 30 attached to the hitch 16 from the one or more pieces of identification information stored in the memory 21a.

A working vehicle 1 includes a hitch 16 to attach and detach an attachment 30 thereto and therefrom, a receiver 23 to receive one or more wireless signals Q1 which are transmitted periodically from one or more transmitters 33 in or on one or more of the attachments 30, which include respective one or more pieces of identification information of the one or more attachments 30, and which are compliant with a near field communication standard, and a controller 21 configured or programmed to select a piece of identification information of the attachment 30 attached to the hitch 16 based on the one or more pieces of identification information included in the one or more wireless signals Q1 received by the receiver 23 and on one or more received signal strengths of the one or more wireless signals Q1, and perform a predetermined process based on the selected piece of identification information, wherein the controller 21 is configured or programmed to cause a memory 21a to store, for a period of time T4, the one or more pieces of identification information and the one or more received signal strengths of the one or more wireless signals Q1 at one or more points in time at which the one or more pieces of identification information are received such that the one or more pieces of identification information and the one or more received signal strengths are associated with each other, calculate one or more elapsed times from when the one or more wireless signals Q1 including the one or more pieces of identification information are received or one or more elapsed times from when the one or more pieces of identification information are stored in the memory 21a, calculate one or more judgment values based on the one or more received signal strengths and the one or more elapsed times, and select, based on the one or more judgment values, the piece of identification information of the attachment 30 attached to the hitch 16 from the one or more pieces of identification information stored in the memory 21a.

An attachment usage system 100 includes a hitch 16 on a working vehicle 1 to attach and detach an attachment 30 thereto and therefrom, one or more transmitters 33 in or on one or more of the attachments 30 to periodically transmit one or more wireless signals Q1 which include one or more pieces of identification information of the one or more attachments 30 and which are compliant with a near field communication standard, a receiver 23 in or on the working vehicle 1 to receive the one or more wireless signals Q1 transmitted from the one or more transmitters 33, and a controller 21 configured or programmed to select a piece of identification information of the attachment 30 attached to the hitch 16 based on the one or more pieces of identification information included in the one or more wireless signals Q1 received by the receiver 23 and on one or more received signal strengths of the one or more wireless signals Q1, and perform a predetermined process based on the selected piece of identification information, wherein the controller 21 is configured or programmed to cause a memory 21a to store, for a period of time T4, the one or more pieces of identification information included in the one or more wireless signals Q1 received by the receiver 23, calculate one or more elapsed times from when the one or more wireless signals Q1 including the one or more pieces of identification information are received or one or more elapsed times from when the one or more pieces of identification information are stored in the memory 21a, calculate one or more judgment values based on the one or more received signal strengths of the one or more wireless signals Q1 at one or more points in time at which the one or more pieces of identification information are received and on the one or more elapsed times, and select, based on the one or more judgment values, the piece of identification information of the attachment 30 attached to the hitch 16 from the one or more pieces of identification information stored in the memory 21a.

An attachment usage system 100 includes a hitch 16 on a working vehicle 1 to attach and detach an attachment 30 thereto and therefrom, one or more transmitters 33 in or on one or more of the attachments 30 to periodically transmit one or more wireless signals Q1 which include one or more pieces of identification information of the one or more attachments 30 and which are compliant with a near field communication standard, a receiver 23 in or on the working vehicle 1 to receive the one or more wireless signals Q1 transmitted from the one or more transmitters 33, and a controller 21 configured or programmed to select a piece of identification information of the attachment 30 attached to the hitch 16 based on the one or more pieces of identification information included in the one or more wireless signals Q1 received by the receiver 23 and on one or more received signal strengths of the one or more wireless signals Q1, and perform a predetermined process based on the selected piece of identification information, wherein the controller 21 is configured or programmed to cause a memory 21a to store, for a period of time T4, the one or more pieces of identification information and the one or more received signal strengths of the one or more wireless signals Q1 at one or more points in time at which the one or more pieces of identification information are received such that the one or more pieces of identification information and the one or more received signal strengths are associated with each other, calculate one or more elapsed times from when the one or more wireless signals Q1 including the one or more pieces of identification information are received or one or more elapsed times from when the one or more pieces of identification information are stored in the memory 21a, calculate one or more judgment values based on the one or more received signal strengths and the one or more elapsed times, and select, based on the one or more judgment values, the piece of identification information of the attachment 30 attached to the hitch 16 from the one or more pieces of identification information stored in the memory 21a.

With such a working vehicle 1 and attachment usage system 100, it is possible to select the piece of identification information of the attachment 30 based not only on the received signal strength(s) of the wireless signal(s) Q1 transmitted from the transmitter(s) 33 but also on the judgment value(s) in consideration of the elapsed time(s). That is, since it is possible to take into consideration both the distance between each transmitter 33 and the receiver 23 represented by received signal strength (space) and elapsed time (time), it possible to select the piece of identification information of the attachment 30 more accurately than when only space is considered.

The controller 21 may be configured or programmed to calculate the one or more judgment values such that the one or more judgment values concerning the one or more pieces of identification information calculated by the controller 21 decrease as the one or more elapsed times increase.

This makes it possible to select piece(s) of identification information that is/are short in terms of elapsed time in priority to those that are long in terms of elapsed time. In other words, the controller 21 is capable of selecting, with priority, piece(s) of identification information included in wireless signal(s) Q1 received recently.

The controller 21 may be configured or programmed to calculate each of the one or more judgment values based on (i) a correction value obtained by multiplying a corresponding elapsed time by a coefficient and (ii) a corresponding received signal strength of a corresponding wireless signal Q1 when a corresponding piece of identification information is received.

This makes it possible not only to easily calculate a judgment value but also to obtain the judgment value having a weight assigned thereto based on elapsed time.

The controller 21 may be configured or programmed to calculate each of the one or more judgment values by subtracting the correction value from the corresponding received signal strength of the corresponding wireless signal Q1 when the corresponding piece of identification information is received or by dividing, by the correction value, the corresponding received signal strength of the corresponding wireless signal Q1 when the corresponding piece of identification information is received.

This allows the controller 21 to easily calculate a judgment value and reduce the calculation load on the controller 21, making it possible to quickly and appropriately select the piece of identification information of the attachment 30.

The controller 21 may be configured or programmed to perform the predetermined process based on one of the one or more pieces of identification information stored in the memory 21a that is highest in terms of a judgment value when the attachment 30 is attached to the hitch 16.

This makes it possible to select a piece of identification information included in a wireless signal Q1 which has a relatively high received signal strength and which was transmitted from a transmitter 33 at a relatively short distance from the receiver 23 relatively recently. Thus, even if a plurality of attachments 30 are present in the vicinity of the working vehicle 1 and at least one of the attachments 30 is in a stationary state in which, for example, it is allowed to stand without making any movement or action or even if at least one of the attachments 30 is in a dynamic state in which, for example, it is attached to another working vehicle 1 or the like and moving, the controller 21 can reliably and easily select from the memory 21a the piece of identification information and appropriately and immediately start the predetermined process according to the selected piece of identification information.

The controller 21 may be configured or programmed to, if two or more pieces of identification information of the one or more pieces of identification information stored in the memory 21a are the highest in terms of the judgment value when the attachment 30 is attached to the hitch 16, perform the predetermined process based on one of the two or more pieces of identification information that is longest in terms of an elapsed time.

This allows the controller 21 to, in a case that the judgment value calculated low because of weighting and the judgment value calculated high because of weighting are the same, select a piece of identification information having a higher received signal strength than others. In other words, the controller 21 is capable of, in a case that there are two or more highest judgment values, selecting a piece of identification information by prioritizing the distance between the transmitter 33 and the receiver 23 (space) over an elapsed time (time).

The controller 21 may be configured or programmed to, if two or more pieces of identification information of the one or more pieces of identification information stored in the memory 21a are highest in terms of the judgment value when the attachment 30 is attached to the hitch 16, perform the predetermined process based on one of the two or more pieces of identification information that is shortest in terms of an elapsed time.

This allows the controller 21, to in a case that the judgment value calculated low because of weighting and the judgment value calculated high because of weighting are the same, select a piece of identification information that is shorter than others in terms of an elapsed time. In other words, the controller 21 is capable of, in a case that there are two or more highest judgment values, selecting a piece of identification information by prioritizing elapsed time (time) over the distance between the transmitter 33 and the receiver 23 (space).

The working vehicle 1 may further include an operation switch 26 to be operated to attach the attachment 30 to the hitch 16. The controller 21 may be configured or programmed to determine whether or not the attachment 30 is attached to the hitch 16 based on an operation state of the operation switch 26.

This allows the controller 21 to determine that the attachment 30 is attached to the hitch 16 as intended by the operator operating the operation switch 26, timely select the piece of identification information of the attachment 30 attached to the hitch 16, and timely start and continue the predetermined process.

The controller 21 may be configured or programmed to determine that the attachment 30 is attached to the hitch 16 if the operation switch 26 is operated for a predetermined period of time T1 or more.

This allows the controller 21 to more reliably determine that the attachment 30 is attached to the hitch 16 as intended by the operator operating the operation switch 26.

The controller 21 may be configured or programmed to select the piece of identification information of the attachment 30 attached to the hitch 16 from one or more of the one or more pieces of identification information included in one or more of the one or more wireless signals Q1 received by the receiver 23 that are higher in terms of a received signal strength or a judgment value than a predetermined value.

This allows the controller 21 to preliminary narrow down the pieces of identification information to be referred to, making it possible to reduce the calculation load on the controller 21 and allow the controller 21 to quickly and appropriately select the piece of identification information of the attachment 30.

The controller 21 may be configured or programmed to cause the memory 21a to store one or more of the one or more pieces of identification information included in one or more of the one or more wireless signals Q1 received by the receiver 23 that are higher in terms of a received signal strength or a judgment value than a predetermined value, and cause the memory 21a to not store any of the one or more pieces of identification information included in one or more of the one or more wireless signals Q1 received by the receiver 23 that are equal to or lower than the predetermined value in terms of the received signal strength or the judgment value.

With this, it is possible to prevent the controller 21 from referring to piece(s) of identification information of wireless signal(s) Q1 with a received signal strength or a judgment value of the predetermined value or less, making it possible to preliminary narrow down the pieces of identification information to be referred to. This makes it possible to more reliably reduce the calculation load on the controller 21, and allow the controller 21 to quickly and appropriately select the piece of identification information of the attachment 30.

While example embodiments of the present invention have been described above, it is to be understood that variations and modifications will be apparent to those skilled in the art without departing from the scope and spirit of the present invention. The scope of the present invention, therefore, is to be determined solely by the following claims.

For example, in the above-described example embodiments, each attachment 30 is provided with a beacon transmitter 33 to transmit a wireless signal (advertisement signal Q1) compliant with Bluetooth (registered trademark) Low Energy, and the working vehicle 1 is provided with a beacon scanner 23 to receive the wireless signals. However, additionally or alternatively, for example, the attachment 30 may be provided with a transmitter such as a radio frequency identification (RFID) tag, and the working vehicle 1 may be provided with a receiver to receive wireless signals transmitted from the RFID. Additionally or alternatively, the attachment 30 may be provided with a transmitter to transmit radio waves for some other near field communication, and the working vehicle 1 may be provided with a receiver to receive the radio waves.

In the above-described example embodiments, the working vehicle 1 is provided with the quick hitch 16. Alternatively, the working vehicle 1 may be provided with a hitch having a different structure from the quick hitch 16, a quick hitch to which an attachment 30 can be attached and detached both automatically and manually, or a hitch to which an attachment 30 can be attached and detached only manually. In the case where the operator manually attaches the attachment 30 to the hitch or manually detaches the attachment 30 from the hitch, the operator may input information indicating that the attachment 30 is attached or detached using the user interface 25.

In the above-described example embodiments, the operator inputs attachment information relating to the attachment 30 attached to the quick hitch 16 using the user interface 25 provided in or on the working vehicle 1. However, for example, the operator or the like may input attachment information relating to the attachment 30 attached to the quick hitch 16 using a portable device 70. That is, the portable device 70 may be used as a user interface instead of the user interface 25.

In such a case, upon input of attachment information into the portable device 70, the portable device 70 transmits the attachment information to the communicator 24 of the working vehicle 1 via the Internet and/or the like. Upon receipt of the attachment information by the communicator 24, the controller 21 of the working vehicle 1 recognizes the attachment 30 attached to the quick hitch 16 based on the attachment ID included in the attachment information.

In the above-described example embodiments, the working device 4, the quick hitch 16, and the specific attachment 30b are provided with hydraulic actuators (such as the boom cylinders 14, the front cylinders 15, and the latch cylinder 52). Additionally or alternatively, the working device 4, the quick hitch 16, and the specific attachment may be provided with electric actuators. In the case where an attachment including an electric actuator is attached to the quick hitch 16, the controller 21 may output, as power for the electric actuator, electricity (power) from the battery 20 (FIG. 1) to the attachment via an external electric wire based on control data corresponding to the attachment.

An attachment including a work member to be actuated by power from the prime mover 9 of the working vehicle 1 may be attached to the quick hitch 16. In the case where such an attachment including a work member is attached to the quick hitch 16, the controller 21 may output power from the prime mover 9 to the attachment via a power transmission mechanism including gear(s), shaft(s), and/or the like based on control data corresponding to the attachment.

In the foregoing example embodiments, the controller 21 is configured or programmed to calculate a value for judgment (judgment value) based on RSSI and compares the judgment values of respective attachment IDs to automatically select an attachment ID, for example. Note, however, that the controller 21 may be configured or programmed to selectively enter a mode in which the controller 21 selects an attachment ID automatically (automatic selection mode) or a mode in which an operator or the like manually selects an attachment ID (manual selection mode). In such a case, for example, an administrator performs a predetermined operation on the user interface 25 to enter the automatic selection mode or the manual selection mode. In the manual selection mode, when an attachment 30 is attached to the hitch 16, the controller 21 causes the user interface 25 or the portable device 70 etc. to display an attachment list including a plurality of pieces of attachment information relating to respective attachments 30 attachable to the hitch 16, and starts a predetermined process based on the attachment 30 attached to the hitch 16 that corresponds to one of the pieces of attachment information selected from the attachment list via the user interface 25 or the portable device 70 etc.

What is claimed is:

1. A working vehicle comprising:
   a hitch to attach and detach one of one or more attachments selectively thereto and therefrom;
   a receiver to receive one or more wireless signals which are transmitted periodically from one or more transmitters in or on the one or more of the attachments, which include respective one or more pieces of identification information of relating to the one or more attachments, and which are compliant with a near field communication standard; and
   a controller configured or programmed to:
     select a piece of identification information relating to an attached one of the one or more attachments attached to the hitch based on the one or more wireless signals received by the receiver; and
     perform a predetermined process based on the selected piece of identification information; wherein
   the controller is configured or programmed to:
     cause a memory to store, for a period of time, the one or more pieces of identification information included in the one or more wireless signals received by the receiver;
     calculate one or more elapsed times from when the one or more wireless signals including the one or more pieces of identification information are received or one or more elapsed times from when the one or more pieces of identification information are stored in the memory;
     calculate one or more judgment values based on one or more received signal strengths of the one or more wireless signals at one or more points in time at which the one or more pieces of identification information are received and on the one or more elapsed times; and
     select, based on the one or more judgment values, the piece of identification information relating to the attached one of the one or more attachments attached to the hitch from the one or more pieces of identification information stored in the memory.

2. The working vehicle according to claim 1, wherein the controller is configured or programmed to calculate the one or more judgment values such that the one or more judgment values concerning the one or more pieces of identification information calculated by the controller decrease as the one or more elapsed times increase.

3. The working vehicle according to claim 2, wherein the controller is configured or programmed to calculate each of the one or more judgment values based on (i) a correction value obtained by multiplying a corresponding elapsed time by a coefficient, and (ii) a corresponding received signal strength of a corresponding wireless signal when a corresponding piece of identification information is received.

4. The working vehicle according to claim 3, wherein the controller is configured or programmed to calculate each of the one or more judgment values by subtracting the correction value from the corresponding received signal strength of the corresponding wireless signal when the corresponding piece of identification information is received, or by dividing, by the correction value, the corresponding received signal strength of the corresponding wireless signal when the corresponding piece of identification information is received.

5. The working vehicle according to claim 1, wherein the controller is configured or programmed to perform the predetermined process based on one of the one or more pieces of identification information stored in the memory that is highest in terms of a judgment value when any of the one or more attachments is attached to the hitch.

6. The working vehicle according to claim 5, wherein the controller is configured or programmed to, if two or more pieces of identification information of the one or more pieces of identification information stored in the memory are the highest in terms of the judgment value when any of the one or more attachments is attached to the hitch, perform the predetermined process based on one of the two or more pieces of identification information that is longest in terms of an elapsed time.

7. The working vehicle according to claim 5, wherein the controller is configured or programmed to, if two or more pieces of identification information of the one or more pieces of identification information stored in the memory are the highest in terms of the judgment value when any of the one or more attachments is attached to the hitch, perform the predetermined process based on one of the two or more pieces of identification information that is shortest in terms of an elapsed time.

8. The working vehicle according to claim 5, further comprising an operation switch to be operated to attach one of the one or more attachments selectively to the hitch; wherein
   the controller is configured or programmed to determine whether or not any of the one or more attachments is attached to the hitch based on an operation state of the operation switch.

9. The working vehicle according to claim 8, wherein the controller is configured or programmed to determine that any of the one or more attachments is attached to the hitch if the operation switch is operated for a predetermined period of time or more.

10. The working vehicle according to claim 1, wherein the controller is configured or programmed to select the piece of identification information relating to the attached one of the one or more attachments attached to the hitch from one or more of the one or more pieces of identification information included in one or more of the one or more wireless signals received by the receiver that are higher in terms of a received signal strength or a judgment value than a predetermined value.

11. The working vehicle according to claim 1, wherein the controller is configured or programmed to:
cause the memory to store one or more of the one or more pieces of identification information included in one or more of the one or more wireless signals received by the receiver that are higher in terms of a received signal strength or a judgment value than a predetermined value; and
cause the memory to not store any of the one or more pieces of identification information included in one or more of the one or more wireless signals received by the receiver that are equal to or lower than the predetermined value in terms of the received signal strength or the judgment value.

12. A working vehicle comprising:
a hitch to attach and detach one of one or more attachments selectively thereto and therefrom;
a receiver to receive one or more wireless signals which are transmitted periodically from one or more transmitters in or on the one or more attachments, which include respective one or more pieces of identification information relating to the one or more attachments, and which are compliant with a near field communication standard; and
a controller configured or programmed to:
select a piece of identification information relating to an attached one of the one or more attachments attached to the hitch based on the one or more wireless signals received by the receiver; and
perform a predetermined process based on the selected piece of identification information; wherein
the controller is configured or programmed to:
cause a memory to store, for a period of time, the one or more pieces of identification information and one or more received signal strengths of the one or more wireless signals at one or more points in time at which the one or more pieces of identification information are received such that the one or more pieces of identification information and the one or more received signal strengths are associated with each other;
calculate one or more elapsed times from when the one or more wireless signals including the one or more pieces of identification information are received or one or more elapsed times from when the one or more pieces of identification information are stored in the memory;
calculate one or more judgment values based on the one or more received signal strengths and the one or more elapsed times; and
select, based on the one or more judgment values, the piece of identification information relating to the attached one of the one or more attachments attached to the hitch from the one or more pieces of identification information stored in the memory.

13. The working vehicle according to claim 12, wherein the controller is configured or programmed to calculate the one or more judgment values such that the one or more judgment values concerning the one or more pieces of identification information calculated by the controller decrease as the one or more elapsed times increase.

14. The working vehicle according to claim 13, wherein the controller is configured or programmed to calculate each of the one or more judgment values based on (i) a correction value obtained by multiplying a corresponding elapsed time by a coefficient, and (ii) a corresponding received signal strength of a corresponding wireless signal when a corresponding piece of identification information is received.

15. The working vehicle according to claim 14, wherein the controller is configured or programmed to calculate each of the one or more judgment values by subtracting the correction value from the corresponding received signal strength of the corresponding wireless signal when the corresponding piece of identification information is received, or by dividing, by the correction value, the corresponding received signal strength of the corresponding wireless signal when the corresponding piece of identification information is received.

16. The working vehicle according to claim 12, wherein the controller is configured or programmed to perform the predetermined process based on one of the one or more pieces of identification information stored in the memory that is highest in terms of a judgment value when any of the one or more attachments is attached to the hitch.

17. The working vehicle according to claim 16, wherein the controller is configured or programmed to, if two or more pieces of identification information of the one or more pieces of identification information stored in the memory are the highest in terms of the judgment value when any of the one or more attachments is attached to the hitch, perform the predetermined process based on one of the two or more pieces of identification information that is longest in terms of an elapsed time.

18. The working vehicle according to claim 16, wherein the controller is configured or programmed to, if two or more pieces of identification information of the one or more pieces of identification information stored in the memory are the highest in terms of the judgment value when any of the one or more attachments is attached to the hitch, perform the predetermined process based on one of the two or more pieces of identification information that is shortest in terms of an elapsed time.

19. The working vehicle according to claim 16, further comprising an operation switch to be operated to attach one of the one or more attachments selectively to the hitch; wherein
the controller is configured or programmed to determine whether or not any of the one or more attachments is attached to the hitch based on an operation state of the operation switch.

20. The working vehicle according to claim 19, wherein the controller is configured or programmed to determine that any of the one or more attachments is attached to the hitch if the operation switch is operated for a predetermined period of time or more.

21. The working vehicle according to claim 12, wherein the controller is configured or programmed to select the piece of identification information relating to the attached one of the one or more attachments attached to the hitch from one or more of the one or more pieces of identification information included in one or more of the one or more wireless signals received by the receiver that are higher in terms of a received signal strength or a judgment value than a predetermined value.

22. The working vehicle according to claim 12, wherein the controller is configured or programmed to:
cause the memory to store one or more of the one or more pieces of identification information included in one or more of the one or more wireless signals received by the receiver that are higher in terms of a received signal strength or a judgment value than a predetermined value; and cause the memory to not store any of the one or more pieces of identification information included in one or more of the one or more wireless signals received by the receiver that are equal to or lower than the predetermined value in terms of the received signal strength or the judgment value.

23. An attachment usage system comprising:

a hitch on a working vehicle to attach and detach an one of one or more attachments selectively thereto and therefrom;

one or more transmitters in or on the one or more attachments to periodically transmit one or more wireless signals which include one or more pieces of identification information relating to the one or more attachments and which are compliant with a near field communication standard;

a receiver in or on the working vehicle to receive the one or more wireless signals transmitted from the one or more transmitters; and a controller configured or programmed to:
  select a piece of identification information relating to an attached one of the one or more attachments attached to the hitch based on the one or more wireless signals received by the receiver; and
  perform a predetermined process based on the selected piece of identification information; wherein
the controller is configured or programmed to:
  cause a memory to store, for a period of time, the one or more pieces of identification information included in the one or more wireless signals received by the receiver;
  calculate one or more elapsed times from when the one or more wireless signals including the one or more pieces of identification information are received or one or more elapsed times from when the one or more pieces of identification information are stored in the memory;
  calculate one or more judgment values based on the one or more received signal strengths of the one or more wireless signals at one or more points in time at which the one or more pieces of identification information are received and on the one or more elapsed times; and
  select, based on the one or more judgment values, the piece of identification information relating to the attached one of the one or more attachments attached to the hitch from the one or more pieces of identification information stored in the memory.

24. An attachment usage system comprising:

a hitch on a working vehicle to attach and detach an one of one or more attachments selectively thereto and therefrom;

one or more transmitters in or on the one or more attachments to periodically transmit one or more wireless signals which include one or more pieces of identification information relating to the one or more attachments and which are compliant with a near field communication standard;

a receiver in or on the working vehicle to receive the one or more wireless signals transmitted from the one or more transmitters; and a controller configured or programmed to:
  select a piece of identification information relating to an attached one of the one or more attachments attached to the hitch based on the one or more wireless signals received by the receiver; and
  perform a predetermined process based on the selected piece of identification information; wherein
the controller is configured or programmed to:
  cause a memory to store, for a period of time, the one or more pieces of identification information and one or more received signal strengths of the one or more wireless signals at one or more points in time at which the one or more pieces of identification information are received such that the one or more pieces of identification information and the one or more received signal strengths are associated with each other;
  calculate one or more elapsed times from when the one or more wireless signals including the one or more pieces of identification information are received or one or more elapsed times from when the one or more pieces of identification information are stored in the memory;
  calculate one or more judgment values based on the one or more received signal strengths and the one or more elapsed times; and
  select, based on the one or more judgment values, the piece of identification information relating to the attached one of the one or more attachments attached to the hitch from the one or more pieces of identification information stored in the memory.

* * * * *